United States Patent
Tehranchi et al.

(10) Patent No.: US 9,251,322 B2
(45) Date of Patent: Feb. 2, 2016

(54) SIGNAL CONTINUITY ASSESSMENT USING EMBEDDED WATERMARKS

(71) Applicants: Babak Tehranchi, San Diego, CA (US); Rade Petrovic, San Diego, CA (US); Joseph M. Winograd, San Diego, CA (US); Dean Anthony Angelico, San Diego, CA (US)

(72) Inventors: Babak Tehranchi, San Diego, CA (US); Rade Petrovic, San Diego, CA (US); Joseph M. Winograd, San Diego, CA (US); Dean Anthony Angelico, San Diego, CA (US)

(73) Assignee: Verance Corporation, San Diego, CA (US)

( * ) Notice: Subject to any disclaimer, the term of this patent is extended or adjusted under 35 U.S.C. 154(b) by 0 days.

(21) Appl. No.: 14/733,716

(22) Filed: Jun. 8, 2015

(65) Prior Publication Data

US 2015/0269362 A1    Sep. 24, 2015

Related U.S. Application Data

(63) Continuation of application No. 11/880,139, filed on Jul. 19, 2007, now Pat. No. 9,055,239, and a continuation-in-part of application No. 11/501,668, filed on Aug. 8, 2006, now abandoned, and a
(Continued)

(51) Int. Cl.
*G06K 9/00* (2006.01)
*G06F 21/10* (2013.01)
*G06F 21/64* (2013.01)
(Continued)

(52) U.S. Cl.
CPC ............... *G06F 21/10* (2013.01); *G06F 21/64* (2013.01); *G06T 1/0071* (2013.01); *H04N 1/32101* (2013.01); *H04N 1/32288* (2013.01); *G06F 2221/0737* (2013.01); *G06F 2221/2111* (2013.01); *H04L 2463/103* (2013.01);
(Continued)

(58) Field of Classification Search
None
See application file for complete search history.

(56) References Cited

U.S. PATENT DOCUMENTS 5,237,611 A    8/1993    Rasmussen et al.
5,819,289 A    10/1998   Sanford, II et al.
(Continued)

FOREIGN PATENT DOCUMENTS

JP    2004163855    6/2004
JP    2004173237    6/2004
(Continued)

OTHER PUBLICATIONS

Mobasseri, B.G.; Sieffert, M.J.; Simard, R.J., "Content authentication and tamper detection in digital video," Image Processing, 2000. Proceedings. 2000 International Conference on , vol. 1, no., pp. 458-461 vol. 1, 2000.*
(Continued)

*Primary Examiner* — Andrae S Allison
(74) *Attorney, Agent, or Firm* — Perkins Coie LLP; Donald L. Wenskay

(57) ABSTRACT

Methods, apparatus, and systems for signal continuity assessment using embedded watermarks are provided. The embedded watermarks are recovered from the content and one or more attributes associated with the recovered watermarks are identified. A continuity of the content can then be assessed in accordance with the one or more attributes. The continuity assessment may be based on a variety of factors, including but not limited to a determined heartbeat of the recovered watermarks, a density, separation, location, or extent, of the recovered watermarks, as well as information associated with the watermarks, such as a stego key, channel bits, packet numbers, a fingerprint, or the like.

21 Claims, 27 Drawing Sheets

Related U.S. Application Data continuation-in-part of application No. 11/410,961, filed on Apr. 24, 2006, now Pat. No. 7,369,677, and a continuation-in-part of application No. 11/115,990, filed on Apr. 26, 2005, now abandoned, and a continuation-in-part of application No. 11/116,137, filed on Apr. 26, 2005, now Pat. No. 7,616,776, and a continuation-in-part of application No. 10/681,953, filed on Oct. 8, 2003, now Pat. No. 7,788,684.

(60) Provisional application No. 60/833,911, filed on Jul. 28, 2006.

(51) Int. Cl.
*G06T 1/00* (2006.01)
*H04N 1/32* (2006.01)

(52) U.S. Cl.
CPC  *H04N2201/3233* (2013.01); *H04N 2201/3269* (2013.01)

(56) References Cited

U.S. PATENT DOCUMENTS

| | | | |
|---|---|---|---|
| 5,841,978 | A | 11/1998 | Rhoads |
| 5,892,900 | A | 4/1999 | Ginter et al. |
| 6,064,764 | A * | 5/2000 | Bhaskaran ............ G06T 1/0042 382/100 |
| 6,122,610 | A | 9/2000 | Isabelle |
| 6,145,081 | A | 11/2000 | Winograd et al. |
| 6,175,627 | B1 | 1/2001 | Petrovic et al. |
| 6,427,012 | B1 | 7/2002 | Petrovic |
| 6,430,301 | B1 | 8/2002 | Petrovic |
| 6,477,431 | B1 | 11/2002 | Kalker et al. |
| 6,512,837 | B1 * | 1/2003 | Ahmed ................. G06T 1/0028 382/100 |
| 6,523,113 | B1 | 2/2003 | Wehrenberg |
| 6,591,365 | B1 | 7/2003 | Cookson |
| 6,683,958 | B2 | 1/2004 | Petrovic |
| 6,728,390 | B2 * | 4/2004 | Rhoads ................. G06T 1/0071 382/100 |
| 6,792,542 | B1 | 9/2004 | Lee et al. |
| 6,850,626 | B2 * | 2/2005 | Rhoads ................... B42D 25/29 358/3.28 |
| 6,888,943 | B1 | 5/2005 | Lam et al. |
| 6,891,958 | B2 * | 5/2005 | Kirovski ................ G06T 1/005 380/282 |
| 6,931,536 | B2 | 8/2005 | Hollar |
| 6,952,774 | B1 | 10/2005 | Kirovski et al. |
| 7,007,166 | B1 | 2/2006 | Moskowitz et al. |
| 7,024,018 | B2 | 4/2006 | Petrovic |
| 7,142,691 | B2 | 11/2006 | Levy |
| 7,159,118 | B2 | 1/2007 | Petrovic |
| 7,206,649 | B2 * | 4/2007 | Kirovski ............... G10L 19/018 700/94 |
| 7,231,061 | B2 | 6/2007 | Bradley |
| 7,302,575 | B2 * | 11/2007 | Hars .................... G06Q 20/401 380/201 |
| 7,321,666 | B2 | 1/2008 | Kunisa |
| 7,369,677 | B2 * | 5/2008 | Petrovic ................. H04L 9/002 382/100 |
| 7,460,667 | B2 | 12/2008 | Lee et al. |
| 7,616,776 | B2 | 11/2009 | Petrovic et al. |
| 7,788,684 | B2 | 8/2010 | Petrovic et al. |
| 7,983,922 | B2 | 7/2011 | Neusinger et al. |
| 7,986,806 | B2 | 7/2011 | Rhoads |
| 7,991,995 | B2 | 8/2011 | Rabin et al. |
| 8,015,410 | B2 | 9/2011 | Pelly et al. |
| 8,055,013 | B2 | 11/2011 | Levy et al. |
| 8,059,815 | B2 | 11/2011 | Lofgren et al. |
| 8,059,858 | B2 | 11/2011 | Brundage et al. |
| 8,085,935 | B2 | 12/2011 | Petrovic |
| 8,138,930 | B1 | 3/2012 | Heath |
| 8,151,113 | B2 | 4/2012 | Rhoads |
| 8,181,262 | B2 | 5/2012 | Cooper et al. |
| 8,189,861 | B1 | 5/2012 | Rucklidge |
| 8,194,803 | B2 | 6/2012 | Baum et al. |
| 8,249,992 | B2 | 8/2012 | Harkness et al. |
| 8,280,103 | B2 | 10/2012 | Petrovic et al. |
| 8,301,893 | B2 | 10/2012 | Brundage |
| 8,315,835 | B2 | 11/2012 | Tian et al. |
| 8,321,679 | B2 | 11/2012 | Petrovic et al. |
| 8,340,348 | B2 | 12/2012 | Petrovic et al. |
| 8,346,532 | B2 | 1/2013 | Chakra et al. |
| 8,346,567 | B2 | 1/2013 | Petrovic et al. |
| 8,467,717 | B2 | 6/2013 | Croy et al. |
| 8,479,225 | B2 | 7/2013 | Covell et al. |
| 8,533,481 | B2 | 9/2013 | Petrovic et al. |
| 8,538,066 | B2 | 9/2013 | Petrovic et al. |
| 8,588,459 | B2 | 11/2013 | Bloom et al. |
| 8,589,969 | B2 | 11/2013 | Falcon |
| 8,601,504 | B2 | 12/2013 | Stone et al. |
| 8,615,104 | B2 | 12/2013 | Petrovic et al. |
| 8,682,026 | B2 | 3/2014 | Petrovic et al. |
| 8,726,304 | B2 | 5/2014 | Petrovic et al. |
| 8,745,403 | B2 | 6/2014 | Petrovic |
| 8,781,967 | B2 | 7/2014 | Tehranchi et al. |
| 8,791,789 | B2 | 7/2014 | Petrovic et al. |
| 8,806,517 | B2 | 8/2014 | Petrovic et al. |
| 8,811,655 | B2 | 8/2014 | Petrovic et al. |
| 8,838,977 | B2 | 9/2014 | Winograd et al. |
| 8,838,978 | B2 | 9/2014 | Winograd et al. |
| 8,869,222 | B2 | 10/2014 | Winograd et al. |
| 8,923,548 | B2 * | 12/2014 | Petrovic ............... G06K 9/6807 382/100 |
| 9,009,482 | B2 | 4/2015 | Winograd |
| 9,055,239 | B2 * | 6/2015 | Tehranchi ............... G06F 21/10 |
| 9,106,964 | B2 | 8/2015 | Zhao |
| 9,117,270 | B2 | 8/2015 | Wong et al. |
| 2002/0053026 | A1 | 5/2002 | Hashimoto |
| 2002/0168087 | A1 * | 11/2002 | Petrovic ................ G06T 1/0071 382/100 |
| 2004/0073916 | A1 | 4/2004 | Petrovic et al. |
| 2004/0101160 | A1 * | 5/2004 | Kunisa .................. G06T 1/0028 382/100 |
| 2005/0120220 | A1 | 6/2005 | Oostveen et al. |
| 2006/0239501 | A1 | 10/2006 | Petrovic et al. |
| 2007/0039018 | A1 | 2/2007 | Saslow et al. |
| 2011/0261667 | A1 | 10/2011 | Ren et al. |
| 2011/0293090 | A1 | 12/2011 | Ayaki et al. |
| 2011/0320627 | A1 | 12/2011 | Landow et al. |
| 2012/0023595 | A1 | 1/2012 | Speare et al. |
| 2012/0072731 | A1 | 3/2012 | Winograd et al. |
| 2012/0102304 | A1 | 4/2012 | Brave |
| 2012/0122429 | A1 | 5/2012 | Wood et al. |
| 2012/0129547 | A1 | 5/2012 | Andrews, III et al. |
| 2012/0203556 | A1 | 8/2012 | Villette et al. |
| 2012/0203734 | A1 | 8/2012 | Spivack et al. |
| 2012/0216236 | A1 | 8/2012 | Robinson et al. |
| 2012/0265735 | A1 | 10/2012 | McMillan et al. |
| 2012/0272012 | A1 | 10/2012 | Aronovich et al. |
| 2012/0272327 | A1 | 10/2012 | Shin et al. |
| 2012/0300975 | A1 | 11/2012 | Chalamala et al. |
| 2012/0304206 | A1 | 11/2012 | Roberts et al. |
| 2012/0308071 | A1 | 12/2012 | Ramsdell et al. |
| 2013/0031579 | A1 | 1/2013 | Klappert |
| 2013/0060837 | A1 | 3/2013 | Chakraborty et al. |
| 2013/0073065 | A1 | 3/2013 | Chen et al. |
| 2013/0129303 | A1 | 5/2013 | Lee et al. |
| 2013/0151855 | A1 | 6/2013 | Petrovic et al. |
| 2013/0151856 | A1 | 6/2013 | Petrovic et al. |
| 2013/0152210 | A1 | 6/2013 | Petrovic et al. |
| 2014/0067950 | A1 | 3/2014 | Winograd |
| 2014/0074855 | A1 | 3/2014 | Zhao et al. |
| 2014/0075465 | A1 | 3/2014 | Petrovic et al. |
| 2014/0075469 | A1 | 3/2014 | Zhao |
| 2014/0267907 | A1 | 9/2014 | Downes et al. |
| 2014/0270337 | A1 | 9/2014 | Zhao et al. |
| 2014/0279549 | A1 | 9/2014 | Petrovic et al. |
| 2014/0325550 | A1 | 10/2014 | Winograd et al. |
| 2014/0325673 | A1 | 10/2014 | Petrovic |
| 2015/0030200 | A1 | 1/2015 | Petrovic et al. |
| 2015/0121534 | A1 | 4/2015 | Zhao et al. |

(56) References Cited

U.S. PATENT DOCUMENTS

FOREIGN PATENT DOCUMENTS

| | | |
|---|---|---|
| JP | 2004193843 | 7/2004 |
| JP | 2004194233 | 7/2004 |
| JP | 2004328747 | 11/2004 |
| JP | 2005051733 | 2/2005 |
| JP | 2005094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 1020120128149 | 11/2012 |
| WO | 2004036352 | 4/2004 |
| WO | 2005017827 | 2/2005 |
| WO | 2005038778 | 4/2005 |
| WO | 2006051043 | 5/2006 |
| WO | 2006116270 | 11/2006 |
| WO | 2006116394 | 11/2006 |
| WO | 2007019572 | 2/2007 |
| WO | 2009031082 | 3/2009 |
| WO | 2010073236 | 7/2010 |
| WO | 2010135687 | 11/2010 |
| WO | 2011116309 | 9/2011 |
| WO | 2013163921 | 11/2013 |

OTHER PUBLICATIONS

E.T. Lin, C.I Podilchuk, and E.J. Delp. Detection of image alterations using semi-fragile watermarks. In SPIE International Conference on Security and Watermarking of Multimedia Contents II, 2000.*

Kim, T.Y., et al. "An Asymmetric Watermarking System with Many Embedding Watermarks Corresponding to One Detection Watermark", IEEE Signal Processing Letters, vol. 11, No. 3, Mar. 2004, p. 375-377.*

Kirovski, D., et al. "Multimedia Content Screening using a Dual Watermarking and Fingerprinting System," Tech. Rep. MSR-TR-2001-57, Microsoft Research, Jun. 2001.*

J. Lichtenauer, I. Setyawan, T. Kalker, and R. Lagendijk, "Exhaustive geometric search and false positive watermark detection probability," in Proc. SPIE Security and Watermarking Multimedia Contents V, Jan. 2003, pp. 203-214.*

Aris Technologies, Inc. "Audio Watermarking System to Screen Digital Audio Content for LCM Acceptance," May 1999 (17 pages).

Bangaleea, R., et al., "Performance improvement of spread spectrum spatial-domain watermarking scheme through diversity and attack characterisation," IEEE Africon, pp. 293-298, 2002.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

International Search Report and Written Opinion dated Aug. 22, 2007 for International Application No. PCT/US2006/031267, filed Aug. 9, 2006 (2 pages).

International Search Report and Written Opinion dated Jan. 4, 2008 for International Application No. PCT/US2006/015615, filed Apr. 25, 2006 (5 pages).

International Search Report and Written Opinion dated May 19, 2004 for International Application No. PCT/US2003/031816, filed Apr. 29, 2004 (3 pages).

International Search Report and Written Opinion dated May 29, 2008 for International Application No. PCT/US2006/015410, filed Apr. 21, 2006 (6 pages).

Kalker, T., et al., "System issues in digital image and video watermarking for copy protection," Proc. IEEE Int. Conf. on Multimedia Computing and Systems, pp. 562-567, Jun. 1999.

Kirovski, D., et al., "Multimedia content screening using a dual watermarking and fingerprinting system," Proceedings of the tenth ACM international conference, pp. 372-381, 2002.

Kirovski, D., et al., "Multimedia content screening using a dual watermarking and fingerprinting system," Multimedia '02 Proceedings of the tenth ACM international conference on Multimedia, 2002 (11 pages).

Lin, E.T., et al., "Detection of image alterations using semi-fragile watermarks," Proceedings of the SPIE International Conference on Security and Watermarking of Multimedia Contents II, Jan. 2000 (12 pages).

Park, J.H., et al., "Robust and fragile watermarking techniques for documents using bidirectional diagonal profiles," Information and Communications Security: Third International Conference, Xian, China, Nov. 2001, pp. 483-494.

Shih, F.Y., et al., "Combinational, image watermarking in the spatial and frequency domains," Pattern Recognition, 36:696-975, May 2002.

Solanki, K., et al., "Robust image-adaptive data hiding: modeling, source coding and channel coding", 41st Allerton Conference on Communications, Control and Computing, Oct. 2003 (10 pages).

Verance Corporation, "Confirmedia," PowerPoint presentation made to National Association of Broadcasters, Apr. 24, 2001 (40 pages).

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

* cited by examiner

A) Minutes: 1| 2| 3| 4| 5| 6| 7| 8| 9| 10 11 12 13 14 15 16 17 18 19 20 21 22 23 24 25 26 27 28

B) ECRs:
- CID: 12; EncSeq: A; StartEncSeq: A; Duration: 5 min
- CID: 13; EncSeq: B; StartEncSeq: A; Duration: 5 min
- CID: 14; EncSeq: C; StartEncSeq: A; Duration: 5 min
- CID: 15; EncSeq: D; StartEncSeq: A; Duration: 5 min
- CID: 16; EncSeq: E; StartEncSeq: A; Duration: 5 min
- CID: 17; EncSeq: F; StartEncSeq: A; Dur: 3 min C) Segment ACR:
- ACID: 27
- StartEncSeq: A
- EndEncSeq: F
- CID_list: 12,13,14,15,16,17
- Duration: 28 min

SIGNAL CONTINUITY ASSESSMENT USING EMBEDDED WATERMARKS

This application is a continuation of U.S. patent application Ser. No. 11/880,139, filed on Jul. 19, 2007, which is a continuation-in-part of the following commonly-owned U.S. Patent Applications: application Ser. No. 11/501,668, filed on Aug. 8, 2006, now abandoned; application Ser. No. 11/410, 961, filed on Apr. 24, 2006, now U.S. Pat. No. 7,369,677; application Ser. No. 11/115,990, filed on Apr. 26, 2005, now abandoned; application Ser. No. 11/116,137, filed on Apr. 26, 2005, now U.S. Pat. No. 7,616,776; application Ser. No. 10/681,953, filed on Oct. 8, 2003, now U.S. Pat. No. 7,788, 684; and claims the benefit of U.S. Provisional Patent Application No. 60/833,911 filed on Jul. 28, 2006.

BACKGROUND OF THE INVENTION

The present invention relates generally to the field of watermarking. In particular, the present invention relates to methods, apparatus, and systems for signal continuity assessment using embedded watermarks.

Digital Watermarking systems are used in a variety of applications, including copy management, broadcast verification, integrity verification, and tamper detection. In certain applications, it may be desired to determine if a multimedia host signal, comprising audio, video, still images, text or other types of information, has been received in its entirely, in a desired sequence, without additional signal insertions or deletions. In addition, it may be desired to measure the extent of such reordering, insertions, or deletions in a version of the multimedia content, and to determine whether any such modifications were results of intentional signal tampering or were due to expected signal impairments that may occur during the normal course of signal processing and distribution through various communication channels. The measure of insertions, deletions and reordering can be used to assist in discriminating plagiarism or piracy attempts from fair content use, such as content sampling or spurious capture.

The use of watermarks for tamper detection is well documented in the prior art. A typical implementation involves the insertion of 'fragile' watermarks into the host signal. Any subsequent alterations of the host signal would either destroy, degrade or modify the embedded watermarks in a measurable way. Thus the integrity of a received host signal may be verified by detecting the presence and/or quality of the extracted watermarks. In some prior art publications, the embedded watermarks are designed in a way to enable the recognition of the type and amount of processing, or tampering, that has taken place. These fragile watermarks, however, may not be able to withstand significant amounts of host signal alterations and are inevitably destroyed by large signal distortions. In addition, they are not capable of entirely detecting modifications of signal continuity that is one of the objectives of the present invention. For example, an audio signal, containing embedded fragile watermarks, may be cut into several segments and transmitted in an out-of-order sequence with no other modifications. If these cuts are made at proper locations (e.g., along audio signal portions not containing watermarks such as silent intervals), the re-arranged fragile watermarks could remain intact and the tempering may remain undetected.

Another approach is to search for the continuous presence of embedded watermarks within a received host signal. However, simple continuity search may not be very effective since (a) the host content may not be able to accommodate continuous embedding of watermarks (e.g., due to perceptibility considerations), and (b) simple continuity check would not distinguish legitimate versus unauthorized signal alterations that result in host signal discontinuity. In general, signal continuity alterations, such as segment reordering, segment insertions or deletions, may be the result of intentional tempering, may be due to losses incurred in the transmission or storage of the host signal, or may be the result of inadvertent, but legitimate, acts of an authorized party. While, in all three cases, the altered multimedia signal generally contains the same type of impairments, different system reactions may be desired based on the source of such alterations. For example, in a Digital Rights Management (DRM) system that uses embedded watermarks to effect copy protection, an attacker may attempt to interfere with the detection of watermarks by reordering, cutting out or adding segments in the content.

In this case, the desired system reaction may be to stop the playback, recording or transfer of the effected multimedia content in order to prevent the circumvention attempt. In another example, a copy protected movie, with a watermarked audio track, may be playing in the background of a birthday party while one of the participants makes a home video using a camcorder. The recorded home video may contain portions of the copy protected soundtrack, albeit in a fragmented format, with various deletions, additions or out-of-order sequences. In this scenario, a playback or recording device, which is equipped with a DRM compliant watermark detector, may be required not to interfere with the playback or recording of the home video. In yet another example involving a broadcast monitoring system, an embedded multimedia content may be transmitted through a noisy terrestrial broadcast channel and received at a monitoring station. In this case, some embedded watermarks may be lost due to inherent distortions of the transmission channel, resulting in a detected watermark sequence that resembles cuts, additions or out-of-order sequencing of the host content. The proper system reaction in this case may involve a best-estimate reconstruction of the detected watermark sequence in order to verify the start time, duration, and other pertinent information regarding the broadcast of a particular program. Furthermore, it may be desired to identify truncations, edits, or repeats of broadcast programming that may have taken place prior to the broadcast (but after the watermark embedding) of the host content. Therefore, it is not only necessary to detect discontinuities in a host signal but it is also important to identify candidate causes of such discontinuities in order to initiate an appropriate system response.

Differing system reactions to the detection of a discontinuous host signal could also create security loopholes since an attacker may alter the host content to mimic legitimate modifications. It is therefore important to provide the capability for identifying legitimate versus unauthorized alterations, or alternatively, to set limitations on the extent of allowable authorized modifications to a content. The methods, apparatus, and systems of the present invention provide the foregoing and other advantages.

SUMMARY OF THE INVENTION

The present invention relates to methods, apparatus, and systems for signal continuity assessment using embedded watermarks.

In an example embodiment of the present invention, a method for assessing continuity of a content using embedded watermarks is provided. The embedded watermarks are recovered from the content and one or more attributes associated with the recovered watermarks are identified. A continuity of the content can then be assessed in accordance with the one or more attributes.

The attributes may comprise at least one of a type, payload, number of occurrence, frequency of occurrence, separation, density, quality, duration, extent, scale of the recovered watermarks, or the like.

The continuity assessment may comprise determining a presence of at least one of cuts, insertions, and re-ordering of segments in the content. Alternately, the continuity assessment may comprise determining an amount of at least one of cuts, insertions and re-ordering of the content. In addition, the continuity assessment may comprise determining an amount of inserted segments with no watermarks and/or determining an amount of inserted segments that comprise embedded watermarks.

The continuity assessment may be conducted in a presence of content scaling.

The method may further comprise determining a presence of spuriously captured watermarked segments. This determining may comprise comparing an extent of recovered watermarked content to an extent of original watermarked content.

A further method for assessing continuity of a content using embedded watermarks is provided in accordance with an example embodiment of the present invention. In this embodiment, the embedded watermarks are recovered from the content and a "heartbeat" or periodicity of the recovered watermarks is determined. Continuity of the content can then be determined in accordance with the heartbeat.

The continuity assessment may comprise determining an amount of at least one of cuts and insertions in the content.

The recovered watermarks may comprise packet numbers and the assessing may be conducted in accordance with the packet numbers. For example, an amount of content re-ordering may be determined in accordance with the packet numbers. The packet numbers may be embedded as payloads of independently recoverable watermarks. Alternatively, the packet numbers may be embedded as part of a larger payload of the embedded watermarks.

The method may further comprise determining a presence of spuriously captured watermarked segments.

The present invention also includes a further example embodiment of a method for assessing continuity of a content using embedded watermarks. In this example embodiment, the embedded watermarks are recovered from the content and a density and separation of the recovered watermarks are determined. Continuity of the content may then be determined in accordance with the density and separation.

The continuity assessment may comprise determining whether the density and separation conform to one or more predefined distributions. The distributions may be defined in accordance with content usage policies.

The continuity assessment may comprise determining an amount of cuts, insertions, and re-ordering of segments in the content.

The method may further comprise determining a presence of spuriously captured watermarked segments.

An additional method for assessing continuity of a content using embedded watermarks is also provided in accordance with an example embodiment of the present invention. The embedded watermarks are recovered from the content. A stego key associated with the recovered watermarks is determined. Continuity of the content can then be assessed in accordance with the recovered stego key and an embedding stego key.

Only a portion of the embedding stego key may be used for the continuity assessment.

The continuity assessment may comprise determining an amount of at least one of cuts, insertions, and re-ordering of segments in the content.

The method may further comprise determining a presence of spuriously captured watermarked segments.

In a further example embodiment of the present invention, an additional method for assessing continuity of a content using embedded watermarks is provided. In this example embodiment, the embedded watermarks are recovered from the content and channel bits associated with the recovered watermarks are examined to extract signal continuity information. Continuity of the content can then be assessed in accordance with the signal continuity information.

The continuity information may comprise predefined error patterns in the channel bits. The error patterns may uniquely identify channel bits associated with adjacent watermark packets.

The continuity information may comprise predefined scrambling sequences used for scrambling the channel bits. The scrambling sequences may uniquely identify channel bits associated with adjacent watermark packets.

The continuity assessment may comprise determining an amount of at least one of cuts, insertions, and re-ordering of segments in the content.

The method may further comprise determining a presence of spuriously captured watermarked segments.

A method for assessing continuity of a content using sparsely embedded watermarks is also provided in accordance with an example embodiment of the present invention. The sparsely embedded watermarks are recovered from the content. A separation between the recovered watermarks is determined. Continuity of the content is determined in accordance with the separation and a predefined separation.

The sparsely embedded watermarks may be redundantly embedded in the content.

The sparsely embedded watermarks may comprise packet numbers, and the continuity assessment may be conducted in accordance with the packet numbers.

The continuity assessment may comprise determining an amount of at least one of cuts and insertions in the content.

The method may further comprise determining a presence of spuriously captured watermarked segments.

A further method for assessing continuity of a content using embedded watermarks is provided in accordance with an example embodiment of the present invention. The embedded watermarks may be from two or more independently recoverable watermark series in the content. Continuity of the content may be assessed in accordance with relative locations of the recovered watermarks.

The continuity assessment may comprise determining an amount of at least one of cuts, insertions and re-ordering of the content.

The method may further comprise determining a presence of spuriously captured watermarked segments.

At least one series of embedded watermarks may comprise packet numbers and the continuity assessment may be carried out in accordance with the packet numbers.

The relative locations of recovered watermarks in three or more independently embedded watermark series may be used to increase a granularity of the continuity assessment.

The continuity assessment may be carried out by projecting locations of missing watermarks based on locations of one or more of the recovered watermarks.

In a further example embodiment of the present invention, a method for assessing continuity of a content using redundantly embedded watermarks in two or more staggered layers is provided. The embedded watermarks are recovered from two or more staggered layers in the Content. Packet numbers associated with the recovered watermarks are extracted. Continuity of the content may be assessed in accordance with the recovered packet numbers.

The staggering of the layers may be effected by redundantly embedding watermark packets in a first layer for a first repetition segment, and redundantly embedding watermark packets in a second layer for a second repetition segment. An extent of the first repetition segment may be twice an extent of the second repetition segment. Alternatively, the first and second repetition segments may have equal extents and the second layer may be embedded at an offset relative to the first layer.

The continuity assessment may comprise determining an amount of at least one of cuts, insertions and re-ordering of the content.

The method may further comprise determining a presence of spuriously captured watermarked segments.

In accordance with a further example embodiment of the present invention, a method for assessing continuity of a content using fingerprints and embedded watermarks is provided. A content with embedded watermarks is received and one or more watermarks are recovered from the content, A fingerprint associated with the content is calculated. A stored fingerprint is retrieved in accordance with the recovered watermarks. Continuity of the content can then be assessed in accordance with the calculated and retrieved fingerprints.

The embedded watermarks may comprise a content identification payload and the retrieving is conducted in accordance with the payload.

The method may further comprise retrieving additional stored information and assessing the continuity of the content in accordance with the additional information. The additional information may comprise at least one of content duration, title, detectability metric, watermark embedding strength, segmentation information, usage policy, date of expiration, date of authorization, or the like.

The continuity assessment may comprise determining an amount of at least one of cuts, insertions and re-ordering of the content.

The method may further comprise determining a presence of spuriously captured watermarked segments.

A method for assessing continuity of a transmitted content using embedded watermarks is also provided in accordance with a further example embodiment of the present invention. A content is received and embedded watermarks are recovered from the received content. Information stored at a database is retrieved in accordance with the recovered watermarks. Continuity of the received content may then be assessed in accordance with the recovered watermarks and the retrieved information.

The assessing may comprise aggregating the recovered watermarks to form one or more events. The aggregating may comprise detecting a presence of gaps in the received content and producing one or more events in accordance with the gaps. Separate events may be produced when one or more of the gaps exceed a predefined value. The predefined value may be calculated in accordance with a mathematical formulation.

A single event may be produced when one or more of the gaps is less than or equal to a predefined value. The predefined value may be calculated in accordance with a mathematical formulation.

A truncated event may be produced when one or more of the gaps is detected at an end of the events. An event with an offset start is produced when one or more of the gaps is detected at a beginning of the events.

The continuity assessment may comprise determining an amount of at least one of cuts, insertions and re-ordering of the content.

A method for determining an extent of watermarked segments within a content is also provided in accordance with an example embodiment of the present invention. Embedded watermarks are recovered from one or more segments of the content. Continuity of the segments is assessed. An extent of the segments may then be determined in accordance with the continuity assessment and recovered watermarks.

One or more of the watermarked segments may be uniquely identified in accordance with recovered payloads of the watermarks. An electronic citation may be produced in accordance with the identified segment.

One or more of the watermarked segments may be uniquely identified in accordance with the recovered payloads of the watermarks and additional information residing at a database. An electronic citation may be produced in accordance with the identified segments.

Watermark packet prediction may be used to identify boundaries of one or more of the watermarked segments.

The watermark segments may be overlapping in at least one of time, frequency and space.

The method may further comprise managing access to the content in accordance with the extent of the watermarked segments and/or managing access to the content in accordance with gaps between the watermarked segments.

The continuity assessment may comprise determining sequencing information associated with the watermarked segments. The method may further comprise managing access to the content in accordance with the sequencing information.

The method may further comprise managing access to the content in accordance with a recovered payload of the watermarked segments.

A method for managing an Internet content using embedded watermarks is also provided in accordance with an example embodiment of the present invention. Embedded watermarks are recovered from the Internet content. Usage policies associated with the recovered watermarks are determined. A continuity assessment is conducted to determine an extent of watermarked segments within the Internet content. Content management may then be effected in accordance with the usage policies and the continuity assessment.

The continuity assessment may be conducted in accordance with at least one of a type, payload, number of occurrence, frequency of occurrence, separation, density, quality, duration, extent, scale of the recovered watermarks, and the like.

The watermark segments may be overlapping in at least one of time, frequency and space.

The usage policies may be determined in accordance with a payload of the recovered watermarks. The usage policies may be retrieved from a source external to the watermarks. The source may comprise a remote database.

The content management may be effected if the extent of watermarked segments exceeds a pre-defined value. The content management may be effected if the extent of watermarked segments exceeds a pre-defined percentage of an original content.

The present invention also includes systems and apparatus for carrying out the foregoing methods. In addition, those skilled in the art will appreciate that various of the embodiments discussed above (or parts thereof) may be combined in a variety of ways to create further embodiments that are encompassed by the present invention.

BRIEF DESCRIPTION OF THE DRAWINGS

The present invention will hereinafter be described in conjunction with the appended drawing figures, wherein like reference numerals denote like elements, and:

FIG. 11 illustrates event content records and an aggregated content records associated with an embedded content in accordance with an example embodiment of the present invention;

Figure 17:
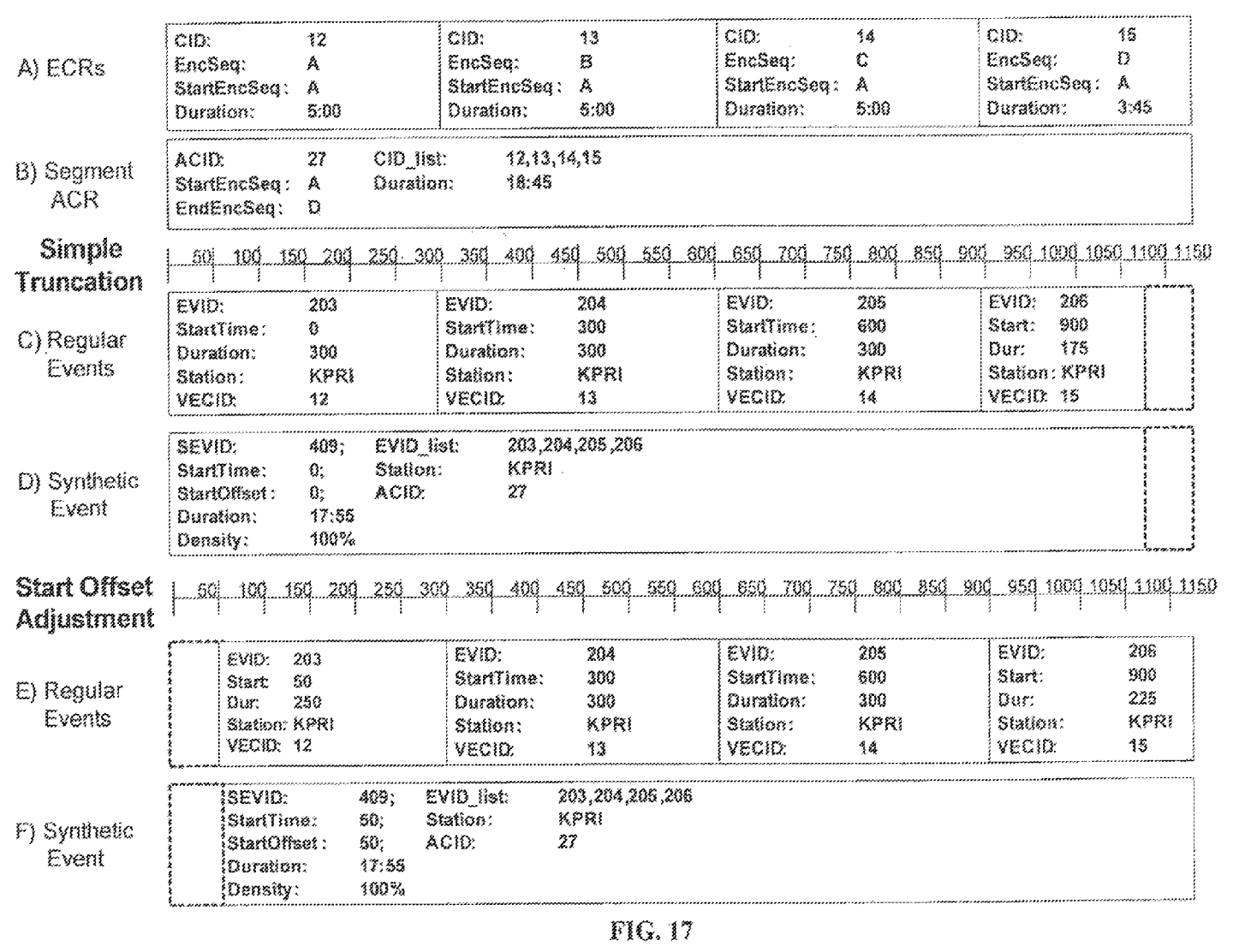

FIG. 17 illustrates synthetic program event truncation in accordance with an example embodiment of the present invention;

DETAILED DESCRIPTION

The following provides a detailed description of the various exemplary embodiments of the present invention. While these details provide specific examples to facilitate a thorough understanding of the present invention, it should be understood that these specific details are exemplary in nature. The present invention may be practiced, by a person skilled in the art, by omitting or modifying these details without departing from the spirit and scope of the invention as set forth by the claims.

Watermark Heartbeat Detection

Figure 1:
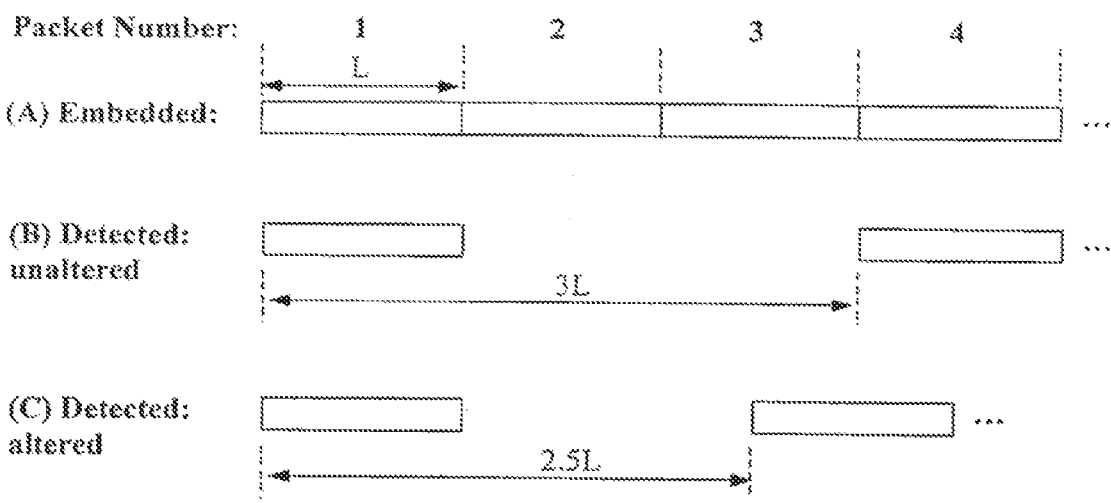
FIG. 1 illustrates continuity assessment using watermark heartbeat detection in accordance with an example embodiment of the present invention.

One method for assessing the continuity of an embedded host content is to evaluate the periodicity of the detected watermarks, also called "heartbeat detection." In such a scheme, a host content is continuously embedded with a string of watermarks with identical payload. The marked content may be transmitted through a noisy communication channel and received at a detector. The detection process is likely to result in the recovery of some, but not all, of the embedded watermarks. Since the original content comprised a continuous back-to-back embedding of watermarks, the separation between the detected watermarks is expected to be an integer multiple of the watermark length. This concept is illustrated in FIG. 1. FIG. 1 may represent the embedded and detected watermark packets in a one-dimensional host signal such as an audio signal, but the illustrated concept can be readily extended to watermarks in two or more dimensions. Section (A) of FIG. 1 depicts the exemplary scenario where four watermarks packets, numbered 1 through 4, each occupy L units (e.g., samples, seconds, etc.) of the host content and are continuously embedded. The detection of embedded watermarks from such a host signal that has been transmitted through a noisy channel may result in the detection of packets 1 and 4 only, as illustrated in section (B) of FIG. 1. However, since the detected packets are exactly 3 L apart, it is likely that no continuity alterations has taken place (for the portion of the host content spanning watermark packets 1 to 4). On the other hand, section (C) of FIG. 1 illustrates the scenario where the host signal has been altered (e.g., cut somewhere between packets 1 and 4). In this case, the disruption in the periodicity or heartbeat of the watermarks is manifested by the reduced distance of 2.5 L between packets 1 and 4. Note that this method does not necessarily require a back-to-back embedding of watermarks. Rather, for this method it suffices to have a regular pre-defined spacing between the embedded watermarks (e.g., there can be unembedded segments between watermark packets).

There is one unaddressed problem with the simple diagram of FIG. 1. Specifically, this simple logic of heartbeat detection fails to identify the root cause of missing detections. For example, the missing detections of section (B)-(C) of FIG. 1 may have been produced by one or more of the following events:

Loss of watermarks due to noisy transmission channel;

Intentional tampering of the host signal, resulting in obliteration of watermarks;

Intermittent capture of an embedded movie sound track at a birthday party;

Intentional insertion of foreign segments; this may comprise adding segments with no watermarks and/or segments that contain a different type of watermark;

Intentional deletion of content segments (e.g., silent intervals, promotional material, etc.) by an attacker;

Intentional reordering of different segments of the host signal by an attacker;

Legitimate content processing operations (e.g., in a broadcast monitoring environment, an embedded program may undergo time scaling to accommodate profanity filtering operations).

Existence of unembedded segments in the original host content (e.g., per director's discretion, due to characteristics of the host signal, etc.)

Some of these issues may be addressed by improving the resiliency of watermarks to various impairments and attacks. These methods are described in commonly owned, co-pending U.S. patent application Ser. Nos. 11/115,990, 11/116,137 and 11/410,961. One particular method may involve the insertion of several independent types of watermarks (e.g., in different frequency bands, with different embedding algorithms, with different embedding parameters, etc.) into the same host signal. This way, a given channel impairment or intentional attack may remove some, but not all, of the embedded watermarks. In addition, signal continuity assessment can be improved by utilizing multiple heartbeats (corresponding to different watermark types) rather than a single heartbeat as is shown in FIG. 1. In particular, an attacker who knows the watermark parameter, L, may be able to remove or insert portions that correspond to integer number of watermarks, thus maintaining the watermarks heartbeat undisturbed. In the presence of multiple watermarks with distinct parameters $L_1, L_2, \ldots$, this would require finding a common period for all watermark types, which may be too long for practical attacks, and/or may be pre-empted by selecting appropriate $L_1, L_2, \ldots$, parameters at the system design level.

Watermark heartbeat detection methods can also be further extended to include the addition of specially tailored fragile watermarks that are susceptible to only a certain type of signal processing or attack. For example, special audio watermarks may be added that are destroyed (or degraded in a special way) if the host signal is acoustically captured by a microphone. Thus the absence or degradation of this type of watermark would indicate the possibility of a camcorder capture. Similarly, the absence or degradation of a different type of watermark may, for example, indicate the presence of lossy compression. Identification of potential attacks or processing mechanisms in this way may help in the selection of the appropriate system reaction to the detection of a discontinuous watermark pattern.

In systems where normal content processing is expected to produce signal scaling issues, a solution may involve allowing a limited amount of time scaling and/or signal insertion in anticipation of such content processing alterations. Such a limit may be set by the system designer after balancing the practical limitations imposed by the signal processing equipment, the quality of the effected signal, and the security risks of the system. For example, in broadcast monitoring applications, profanity filtering (i.e., removing portions of the content that contains profanity, and time-stretching the remainder of the content to "fill the gap") is likely to change the heartbeat by only a few percentage points (otherwise, excessive time scaling would seriously degrade the quality of the broadcast program). In such systems, setting a +/−10% tolerance would allow normal system operation for a watermark packet-to-packet spacing in the range 0.9 L to 1.1 L. Thus, any detected heartbeat that is within 90% to 110% of the "nominal" heartbeat would not raise any flags as it is considered to be within an authorized/expected range of modifications.

The following illustrates further details of how the heartbeat of the recovered watermarks may be used to signal continuity assessment in a one-dimensional signal. Assume watermarks are repeatedly embedded one after the other, with the same payload and the same duration. Then watermark duration, L, can be considered the watermark heartbeat period. Let us consider detection of two watermarks at times t1 and t2, where t2 occurs later in time than t1. The 'heartbeat offset', Δh, may be calculated according to the formula:

$$\Delta h = t2 - t1 - [L * \text{round}((t2-t1)/L)] \quad (1);$$

In most practical watermarking system, heartbeat offset can be different from zero even in the absence of signal discontinuity. For example, the watermark detection process is usually prone to an inherent time measurement uncertainty, τ. The maximum value of this uncertainty is typically one-half of a bit interval but it is possible to further reduce this uncertainty by special techniques. One such method involves the evaluation of bit errors for several adjacent watermark packets that are detected with sub-bit granularity before establishing the precise location of a detected watermark packet. Further details of this technique are disclosed in the commonly-owned U.S. Pat. No. 7,046,808 and will not be discussed further.

Another source of heartbeat offset in the absence of signal discontinuities is scaling of the content signal. Such scaling may occur in two dimensional signals such as images (in which case it is sometimes referred to as stretching), or may occur in one dimensional signals, such as audio signals (in which case it is usually referred to as time scaling), or may occur as a combination of the two, such as scaling in video signals that comprise both spatial and temporal dimensions. It should be also noted that time scaling doesn't imply linear time scaling exclusively. The effect of time scaling can be achieved by one or more cuts or insertions in the signal. In particular, typical pitch-invariant time scaling algorithms involve periodic short cuts/repetitions with fade-in and fade-out transitions. Alternatively, cuts/repetitions can be made during silence intervals, where the overall quality of an audio signal is not significantly affected. Scaling of a content may occur during the normal course of signal processing operations, for example, due to clock imperfection in D/A or A/D conversions (e.g. in analog broadcasts) or variations in tape speeds in tape recordings. In most modern equipment a time scaling tolerance better $\epsilon = 10^{-4}$ is achieved. After accounting for heartbeat irregularities due to watermark measurement uncertainty and scaling operations, heartbeat offset may be flagged when:

$$\text{ABS}(\Delta h) > \tau + \epsilon * (t2-t1) \quad (2);$$

The signal discontinuity measure that is calculated in accordance with equations (1) and (2) is usually sufficient for typical signal integrity verification applications, with the objective of determining if a signal has exceeded a (small) limit of authorized modifications. Conversely, this method is not suitable for measurement of large discontinuities, since all discontinuities of the size $n*L+\Delta h$, $n=0, \pm 1, \pm 2, \pm 3, \ldots$, will show the same heartbeat offset. This is particularly problematic if discontinuity measurement is used to flag spurious capture, or content sampling. Typically an attacker can mimic small discontinuities without too much damage to the content, while actual spurious capture and content sampling entail much larger discontinuities.

In order to illustrate some of the capabilities as well as limitations of the heartbeat offset calculations of equations (1) and (2), lets assume that a content loses its value (and thus is no longer in need of copy protection) if it has undergone more than ±10% time scaling (i.e., $\epsilon$=0.1). Using equations (1) and (2), and assuming $\tau/L$=0.01, the discontinuity flag status (i.e., whether or not equation (2) is satisfied) as a function of (t2−t1)/L is plotted in FIG. 2.

Figure 2:
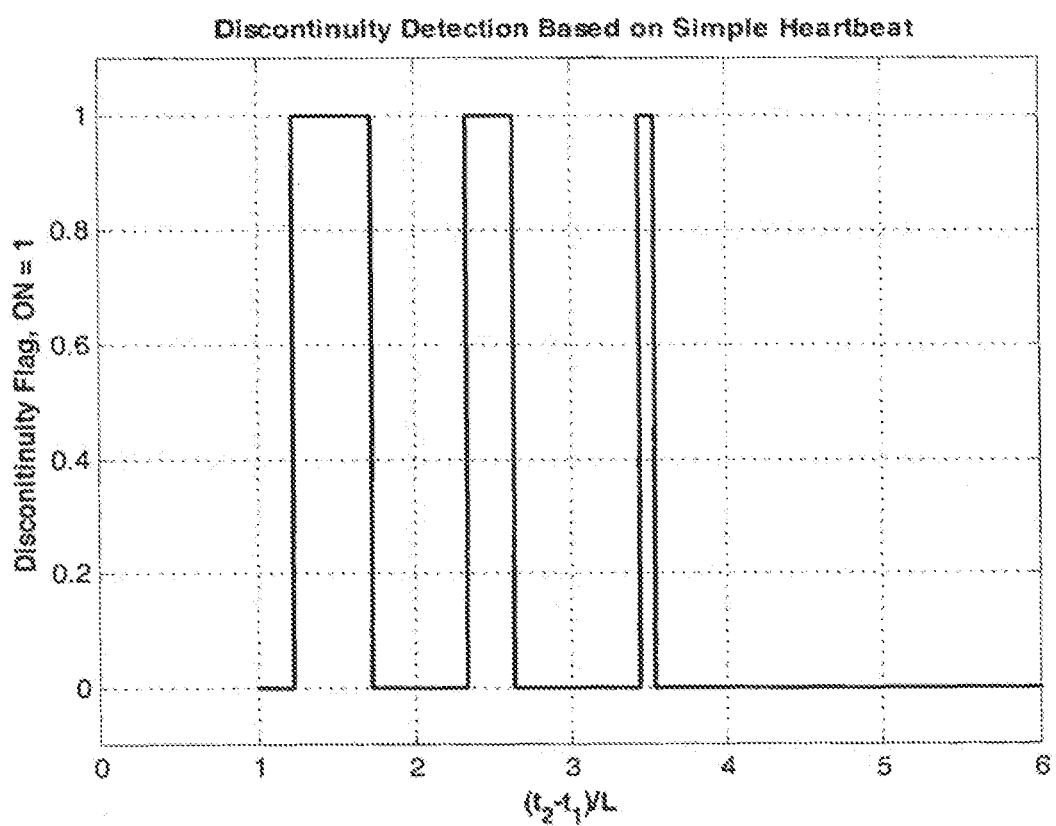
FIG. 2 illustrates continuity assessment using watermark heartbeat detection in accordance with an example embodiment of the present invention.

FIG. 2 indicates that for a (t2−t1)/L value of less than 2 (i.e., when both watermarks immediately before and immediately after a discontinuity are detected), there is a reasonable chance of detecting the discontinuity. On the other hand, when (t2−t1)/L becomes greater than 4 (i.e., when no watermarks in the close vicinity of the discontinuity are detected), the discontinuity flag is almost always turned off.

It should be noted that it is possible to improve the detection of watermarks adjacent to the cut using 'packet prediction' and 'partial packet prediction' techniques. These methods employ more aggressive detection mechanisms once a watermark with reasonable certainty has been detected (e.g. after the detection of a strong watermark with probability of false positive less than $10^{-2}$). One such prediction method may involve using the strong watermark as a template to perform template matching with a more permissive error threshold (e.g., a threshold that produces false positives at a rate $10^{-6}$ in the absence of a known watermark template). Similarly, only a fraction of the template may be used to perform fractional template matching, thus pinpointing the exact location of the discontinuity. Also note that it is not necessary for all embedded watermarks to have identical bit patterns in order for packet prediction to be successful. In fact, as long as there is a known relationship between the pattern of embedded watermarks, a single strong watermark detection can be used to generate the correct template for other locations of the content. Other prediction methods include increasing the error and/or erasure correction capabilities of error correction decoders, increasing the soft decision thresholds, and other methods that are disclosed in commonly owned, co-pending U.S. patent application Ser. No. 11/410,961.

While the above described heartbeat detection methods are applicable in resolving signal continuity issues in some applications, they cannot be universally applied to all cases. For example, packet prediction techniques do not work in the absence of strong watermark detections, and birthday party scenarios may not be distinguished from an intentional attack in all cases. In addition, the simple heartbeat measurements may not readily identify truncations, edits, repeats, and segment durations that are required in broadcast monitoring applications.

Insertion of Packet Numbers in Embedded Watermarks

The incorporation of serial numbers into embedded watermarks may be used in conjunction with or separately from the heartbeat monitoring. Once serial number- or counter-carrying watermarks are embedded into the host content in a predefined sequence, their detection from a received host signal in any order other than the embedded sequence would indicate possible alterations or tampering.

Figure 3:
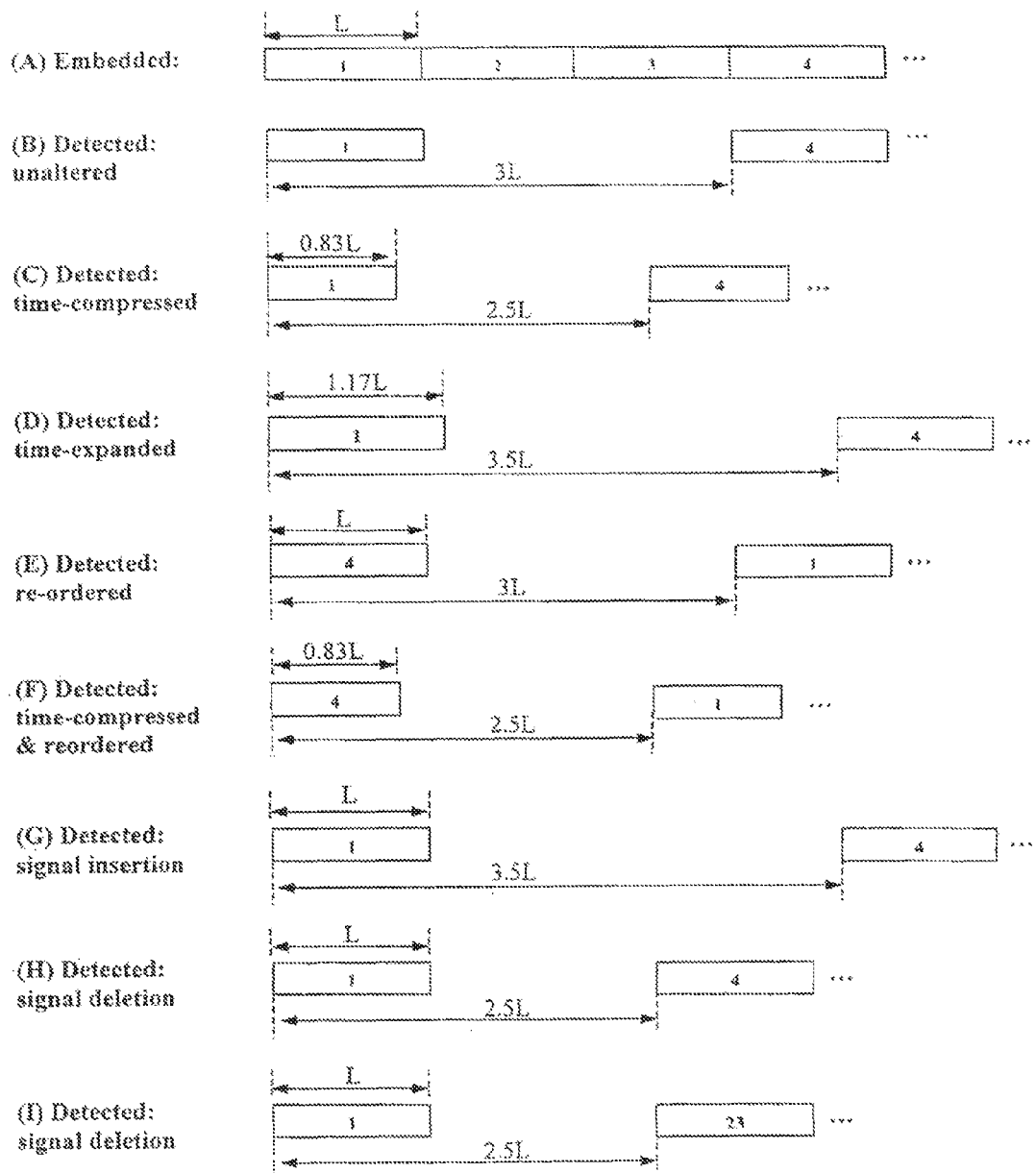
FIG. 3 illustrates continuity assessment using embedded packet numbers in accordance with an example embodiment of the present invention.
Figure 4:
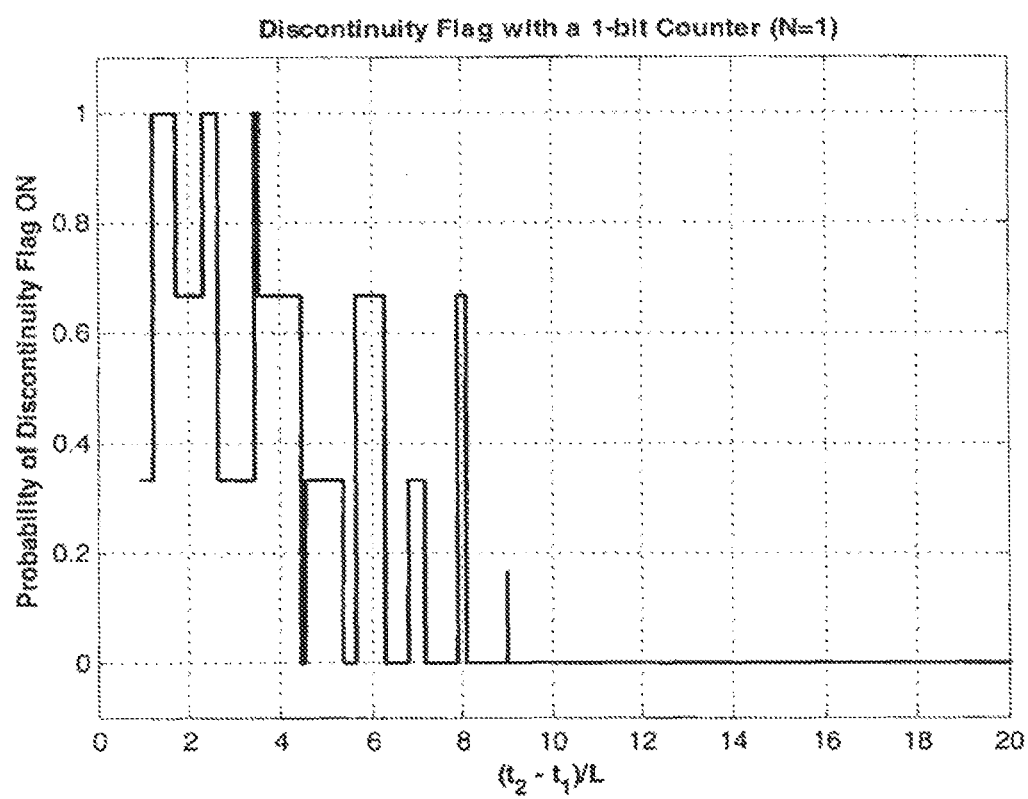
FIGS. 4(A) through 4(D) illustrate continuity assessment using embedded packet numbers in accordance with an example embodiment of the present invention.
Figure 4:
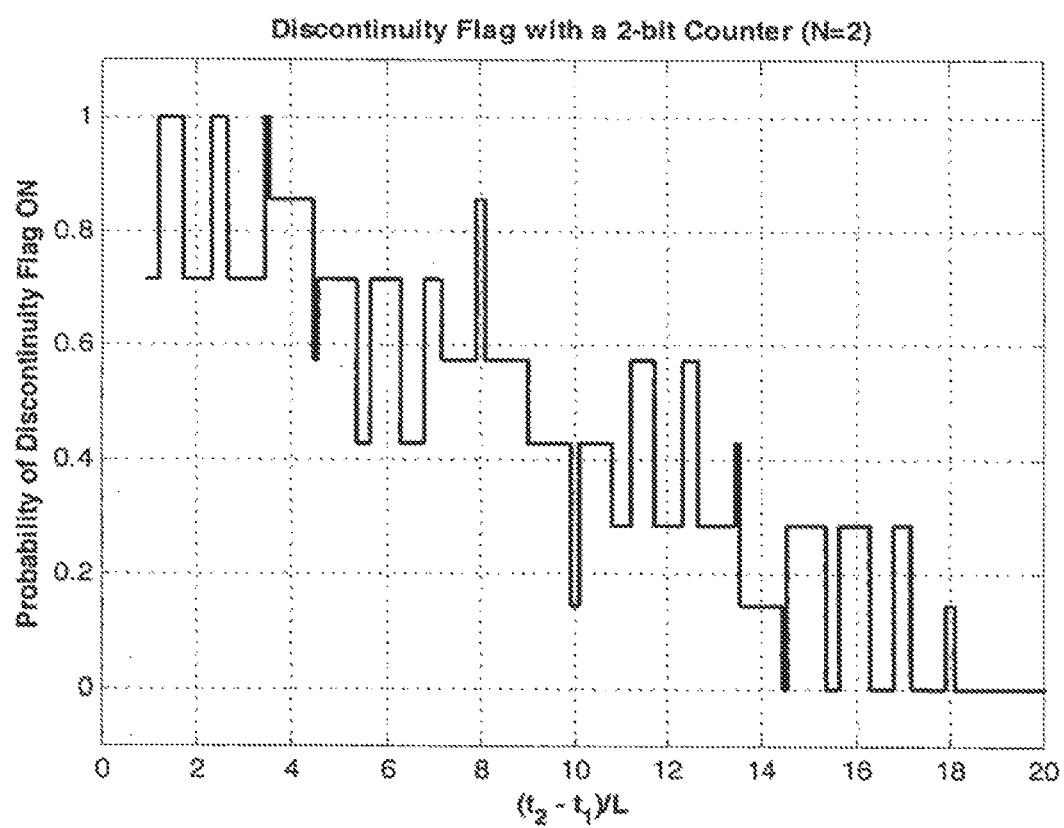
Figure 4:
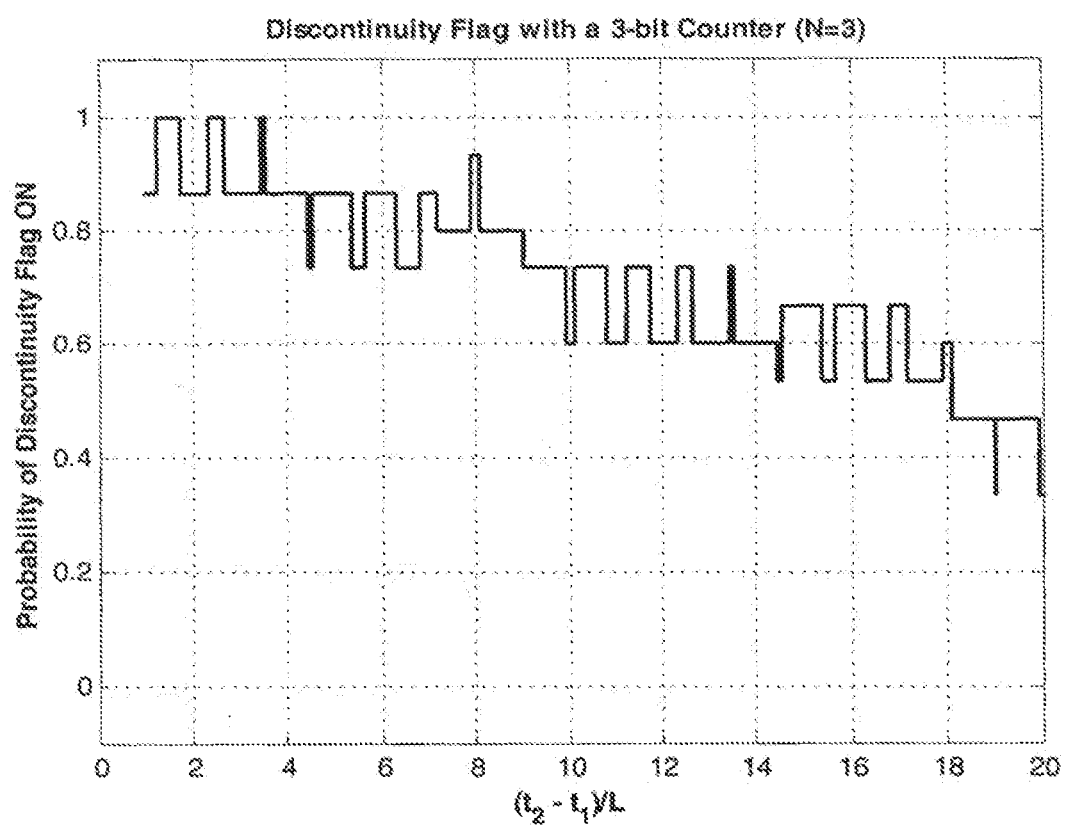
Figure 4:
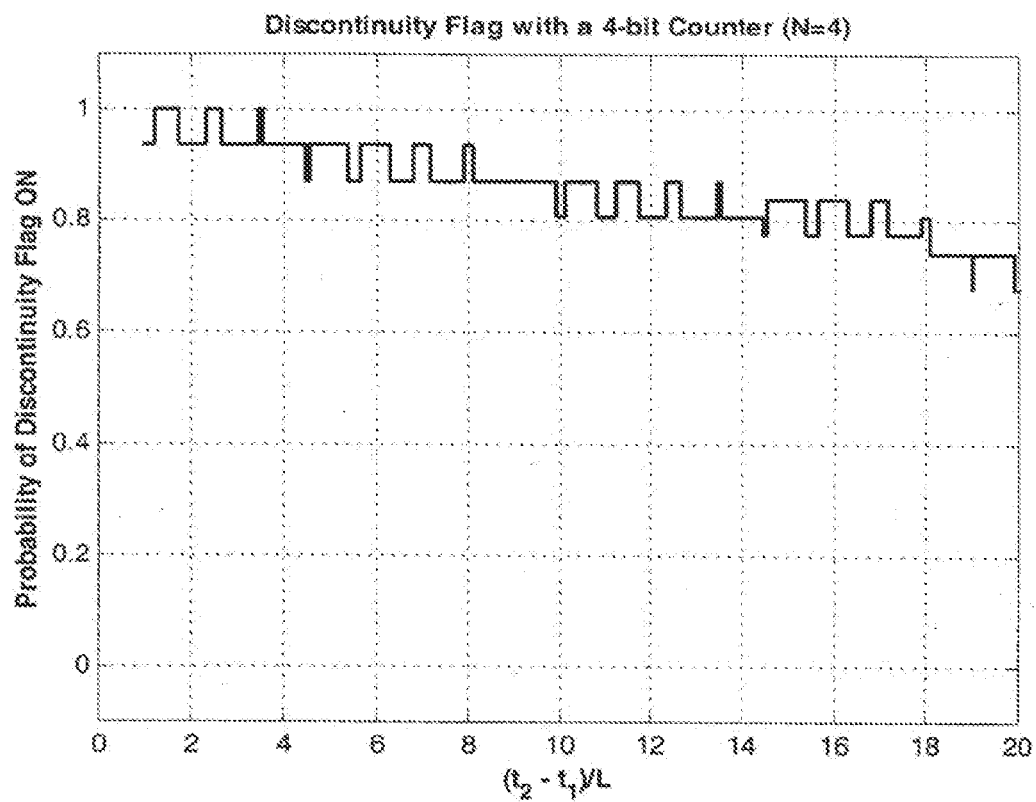

This concept may be further illustrated by considering the following example related to a one-dimensional (e.g., audio) watermarking system. Assume that 8 bits out of a 100-bit watermark payload are allocated to provide 256 sequential numbers, 1 to 256. Further assume that each embedded watermark packet spans 5 seconds of the host content. As a result, up to 22 minutes of the host content may be embedded with 256 back-to-back watermarks, each comprising a unique packet number. Additional segments of the host signal may be embedded by either restarting the packet numbering from 1, or increasing the packet number field to more than 8 bits. Upon the detection of embedded watermarks, the continuity of the received host signal may be assessed by analyzing the relative locations of the detected watermark packets. FIG. 3 illustrates this concept for the signal that was described in accordance with FIG. 1. Section (A) shows the embedded sequence of watermarks with the packet numbers as part of the payload of embedded watermarks. Section (B) shows the detection of packets 1 and 4, with a correct spacing of 3 L. The advantage of this methodology over the simple heartbeat detection of FIG. 1 is in its ability to identify segment reordering in the host content signal. This is illustrated in Section (E), where packet 4 is detected prior to packet 1. Section (C) and (D) illustrate detected watermark packets from a host signal that has undergone 17% time compression and time expansion, respectively. The amount of time scaling may be determined by measuring packet duration and/or packet spacing (similar determination could have been made in the absence of packet numbers). Section (F) shows a similar time-compressed signal but with reordered signal segments, which is now detectable due to the presence of packet numbers. Sections (G) and (H) indicate the presence of signal insertion and signal deletion within respect to the host signal, respectively. Note that Sections (H) and (G) may correspond to either an intentional signal deletion/insertion by an attacker or a camcorder capture of a birthday party (i.e., signal deletion may be simulated by turning off the camcorder for the deletion period, and signal insertion may be simulated by capturing scenes without the presence of copy-protected background audio for the insertion period). Finally, section (I) shows another example of signal deletion in which due to the presence of the watermark counter, the large discontinuity is properly calculated to be 19.5 L (i.e., expected separation of 22 L minus measured separation of 2.5 L).

In some applications, the granularity of continuity detection is seldom required to be as short as a single watermark packet duration. Thus, instead of inserting a different packet number into each watermark packet, several contiguous watermarks may carry the same packet number. For example, if each watermark packet spans 5 seconds of the host signal, packet numbers may be updated every 20 packets (or 100 seconds). This way, over 7 hours of content may be embedded using an 8-bit packet number field. The span of each group with the same packet number is a system design decision that depends on the number of available watermark payload bits, the extent of the host signal that needs to be embedded, and the security policy that governs the reaction to the detection of embedded watermarks.

The following illustrates further details of how the insertion of packet numbers and/or counters into watermark payloads may be used to assess continuity of a one-dimensional signal in cases where simple heartbeat detection fails. Particularly, this technique may be applied in the presence of spurious acoustic captures of a watermarked content (e.g., the birthday party scenario), where the typical discontinuity is expected to be much larger than the watermark duration. Further, this technique can be applied to assist discrimination between plagiarism and piracy attempts from content sampling for fair use of the content such as critique, parody, documentary etc.

Let's consider the case where N watermark payload bits are used to implement a packet counter and m=$2^N$ watermarks are thus repeatedly embedded throughout a content. The goal is to assess the extent and nature of signal continuity if and when the embedded signal undergoes various cuts, insertions, segment re-ordering, or inadvertent captures by a camcorder. Let's assume two watermark packets are detected with payload counter values j and k (j, k=0, 1, 2, ..., m−1), and time stamps t1 and t2, respectively. Let us also denote watermark duration as L, quantized time separation as Δt=(t2−t1)/L, and payload separation as Δm=k−j. Then a discontinuity should be flagged whenever the following inequality is satisfied:

$$ABS(\Delta t - m^* \text{round}(\Delta t/m) - \Delta m) > \tau/L + \epsilon^* \Delta t \quad (3);$$

In equation (3), the parameters τ and ε represent time measurement uncertainty and time scaling tolerance, respectively. Using formula (3), the discontinuity flag status may be calculated for different parameter values. Let's assume that for large discontinuities any value of Δm (between −(m−1) and m−1) is equally probable. Then for τ/L=0.1 and ε=0.1, the probability of a discontinuity being flagged as a function of Δt for N=1, 2, 3, 4 can be represented according to FIGS. 4(A) to 4(D), respectively. Note that a 0-bit counter (N=0) represents the simple case of watermark heartbeat detection that was previously described. FIGS. 4(A) to 4(D) illustrate that the probability of discontinuity detection improves as size of the counter increases. This improvement becomes more evident when adjacent detections are widely separated, which would be the case in the presence of spurious acoustic captures. For example, based on the probability calculations shown in FIG. 4(D), in situations that watermarks are rarely separated by more than 18 L, a 4-bit counter is sufficient to detect about 80% of all discontinuities. On the other hand, the advantages of having a large counter for discontinuity detection must be balanced against the reduction in watermark payload capacity. In general, counter size is a design parameter that depends on many factors, such as the availability of payload capacity, the nature and resiliency of embedded watermarks, the intended application of discontinuity measure, the availability of computational resources needed to embed, detect and decipher additional counter payload, and the required reliability of discontinuity measurement. The overall design objective in the context of continuity detection, however, is to determine a minimum counter size that a) still ensures that there is a negligible chance that an attacker could trigger a discontinuity flag without substantial content damage (usually a subjective evaluation), and b) distinguishes random large discontinuities from intentional attempts to create signal discontinuities.

The following provides an example of how to determine the minimum counter size in an audio watermarking system. Consider a copy protection system that embeds watermarks into the audio portion of feature movies and assume that based on experimental testing done by capturing the movie using a camcorder, the maximum spacing between watermarks that surround a discontinuity is about 3 minutes (this, for example, may represent a scenario in which the movie is being camcordered at movie theatre). In the presence of maximum acceptable time scaling of 10%, the variation of watermark separation is up to 0.1*180 s=18 seconds. On top of this, an attacker may be able to squeeze in individual cuts of up to 12 seconds, for total uncertainty of watermark separation of up to 30 s. Thus, any attack that generates discontinuities (cuts or inserts) that are larger than 30 s over a 3-minute interval may be considered too damaging and may be ignored.

Now let us consider a large discontinuity created by camcordering a birthday party during which a watermarked movie is being played in the background. The discontinuity of captured watermarks will be uniformly distributed over the range [−m*L/2, m*L/2], and the chances that such cut/insert fits [−30 s, 30 s] interval (and thus escape detection) can be calculated as 2*30 s/(m*L). In order to keep the chances of mistaking a large discontinuity for a small discontinuity under 10%, the following inequality must be satisfied:

$$m^*L > 600 \text{ s} \quad (4);$$

For audio watermarks with duration L=3 seconds, m should be larger than 200, and an 8-bit counter would meet this requirement.

Independent Embedding of Serial Numbers

The above described numbering scheme has been presented as having a serial number and/or a counter field within the payload of an existing watermark packet structure. However, the serial number and/or counter can be implemented as a separate watermark that can be independently embedded and subsequently detected from a host signal. Independent embedding of the serial number may be necessary if there are no reserved bits within an existing watermark packet structure. The use of an independent layer/packet may however reduce the transparency of the embedded watermarks and/or may result in increased computational complexity of watermark detections. The amount of any such increase in watermark perceptibility or computational complexity may be traded off against the robustness (i.e., reliability) of watermark detections. For example, in order to maintain the same level of transparency, the two independent layers may be embedded at a reduced gain level at the expense of some reductions in detection robustness (e.g., fewer watermarks will be detected in the presence of noise in the communication channel). Alternatively, the new watermark packets may be embedded at the normal embedding gain levels but in a time and/or frequency interleaved fashion with the existing watermark packets. It should be noted that some of the lost robustness may be recovered by using more sophisticated detection techniques (e.g., soft-decision decoding, time diversity techniques, etc.) at the expense of increased computational complexity of the detection process. The proper tradeoff between the transparency of watermarks, payload capacity, detection robustness and computational complexity of the embedding and detecting processes is a system design decision that must be made by evaluating factors such as customer needs, available computational resources, desired system security, and the like.

Density and Spacing of Detections:

The density and spacing of watermark detections may also be used to assess continuity of a detected signal and to differentiate an authorized (or tolerable) signal discontinuity from an unauthorized one. This technique may be used independently from, or in conjunction with, the packet numbering and heartbeat detection schemes described earlier. Some of the underlying concepts have been described in the context of copy control watermarks in the commonly owned, co-pending U.S. patent application Ser. No. 11/410,961. Specifically, a media player/recorder that is equipped with a watermark detector may be designed to initiate a restrictive enforcement condition (e.g., stop playback/recording of the media, display a warning signal, etc.) only when the density and/or spacing of detected watermarks surpasses a minimum threshold. For example, an enforcement condition may require the detection of at least 10 watermarks in each of 3 consecutive 7-minute segments of the content. This condition provides a grace period (i.e. minimum time interval with no enforcements) of over 14 minutes. In addition, the particular enforcement action and duration may be selected in accordance with the detected watermark states, the density and distribution of such detections, the type of detection device, and the value of the content that is being protected. There are two reasons why having a grace period may be beneficial. First, the reliability of detected watermarks improve as more content is analyzed, and second, a harsh enforcement policy is avoided.

The above described methods of examining the density and spacing of detected watermarks in multiple detection periods can also be used to prevent an enforcement action in a Birthday Party scenario, where only sparse watermarks are present due to inadvertent capture of a background watermarked content. Another approach is to include the 'quality' of detected watermarks as a factor in establishing whether further assessment of watermarks and/or a grace period is necessary. In other words, since acoustic/video capture of the content will inevitably degrade the embedded watermarks, the presence of high quality detections (e.g., watermarks that are detected with few erroneous symbols or missing components) is likely to preclude the possibility of such acoustic/video capture. It is further possible to design the watermarking system in such a way to identify the extent and type of signal modifications by examining a 'fragility profile' of the extracted watermarks. For example, the embedded watermarks may contain certain components that are destroyed completely, or degraded gracefully, as a result of acoustic/video capture. These and other techniques for evaluating and identifying possible signal modifications are described in the commonly owned U.S. Pat. No. 7,046,808.

Continuity Detection Using Sub-Code Signaling

An alternate approach to allocating part of the watermark payload to a serial/packet number is to provide continuity information in a sub-channel or sub-code of the watermarking system without affecting the main payload of existing watermarks in any substantial way. Some specific methods are disclosed herein.

set of unique masking parameters as disclosed in commonly owned copending U.S. patent application Ser. No. 11/115,990 and commonly owned U.S. Pat. No. 6,145,081. Upon recovery of any such content, the masking parameters may be recovered and traced back to a particular instance of embedding. These techniques may also be used to facilitate host signal continuity assessment since cutting, splicing, inserting or re-ordering segments of an embedded host content will inevitably disrupt the stego key and masking parameters of the recovered watermarks. Once this pattern of disruption is identified, the nature and extent of such signal distortions may be readily determined.

This concept may be further illustrated by the use of Table 1 below that provides an example listing of the stego key used for embedding the first six opportunities in a movie soundtrack. If this soundtrack is transmitted and received with no signal manipulations, successful detection of the embedded watermarks is likely to occur in accordance with the same parameters (and in the same order) that are listed in Table 1. In the presence of cuts, insertions or re-ordering of the host signal, however, the detections are likely to occur in a different order (or may be missing altogether). For example, if the host signal corresponding to the second and sixth embedding opportunities were interchanged, watermarks would be recovered according to the sequence (1,6,3,4,5,2) instead of the usual (1,2,3,4,5,6). Using the same convention, a cut in the host signal may be identified by a missing number in the sequence of detected watermarks, e.g., (1,3,4,5,6); and a signal insertion may be identified by a gap in detected watermarks, e.g., (1,B,2,3,4,5,6), where 'B' represents a blank segment (i.e., a segment with no detections).

TABLE 1

Example Embedding Stego Key Used for Continuity Assessment

| Embedding Opportunity | Time Slot | Embedding Algorithm | Frequency Band | Bit Rate | PN Sequence | Delay Value |
|---|---|---|---|---|---|---|
| 1 | 1 | Spread Spectrum | 2 | 35 bps | 1A | NA |
| 2 | 2 | Spread Spectrum | 2 | 56 bps | 2C | NA |
| 3 | 3 | Spread Spectrum | 2 | 35 bps | 3F | NA |
| 4 | 4 | Replica Modulation | 1 | 37.3 bps | NA | 10 ms |
| 5 | 5 | Replica Modulation | 1 | 37.3 bps | NA | 8.4 ms |
| 6 | 6 | Replica Modulation | 1 | 37.3 bps | NA | 13.7 ms |
| ... | ... | ... | ... | ... | ... | ... |

Watermark Stego Key Recognition

As disclosed in the commonly owned co-pending U.S. patent application Ser. No. 11/115,990, watermark stego keys may be utilized for forensic identification of a host content. This may be accomplished by assigning a unique set of embedding stego keys to each embedding device. The stego keys essentially identify the embedding opportunities that are reserved for use by each embedding device. Upon recovery of a content and extraction of the embedded watermarks, the pattern of embedding opportunities can identify the culprit device. In other words, each set of embedding stego keys may serve as a latent serial number for one embedding device. A similar method involves utilization of masking parameters as serial numbers, where each embedder and/or multimedia content undergoing watermark embedding may be assigned a The above example is only a simple illustration of how the watermark stego key may be used for signal continuity detection in accordance with an example embodiment of the present invention. Potentially, this technique allows signal continuity detection to within a single watermark packet granularity. To reach this potential, all identified embedding opportunities must be successfully embedded and subsequently detected. In most practical situations, however, neither the embedding nor the detection of all watermarks is likely to occur (e.g., embedding at certain locations may be prohibited in order to meet perceptibility standards, and detection may not occur due to contaminations by a noisy transmission channel). Thus, several watermarks may be missing from even a continuous host signal. This situation may be remedied by additionally considering the heartbeat of the watermarks. While a 'naturally' missing watermark would not modify the heartbeat of the remaining watermarks, an intentional signal modification is very likely to do so. Thus in the above example, a correctly-spaced detected pattern of (1,B,3,4,5,6) may correspond to a continuous host signal, where the absence of the second watermark can be attributed to less than perfect embedding/detection conditions. It should be noted that in order to increase the reliability of such assessment, the received host signal may be examined for the presence of both strong and weak watermarks. Weak watermarks, as described in commonly owned co-pending patent application Ser. No. 11/410,961, represent detected watermarks that do not meet the reliability standards of strong watermark detections. While weak watermarks alone may not be used for establishing the value of a detected payload, they can be used in conjunction with one or more strong detections to assess the continuity of the host signal.

It is also worth noting that although some applications may require the detection of host signal discontinuity to within a single watermark packet, most applications have a less stringent requirement. In such cases, statistical analysis of the detected watermark stego key may be sufficient to estimate signal continuity to within a broader range of tolerances. The precise statistical measure, and threshold of acceptability (once that measure is calculated) is a system design parameter that can be modified based on customer needs, value of the host signal, and other factors. By the way of example, and not by limitation, one statistical measure may be the proportion of correctly recovered watermarks (e.g., with correct value, in the correct sequence, and with the correct spacing) in conformance with the embedding stego key. This measure may be calculated as the correlation coefficient between the detected and embedded stego keys for a certain duration of the host signal; a 'success' may be declared (i.e., no discontinuity, acceptable discontinuity, etc.), if this correlation coefficient exceeds a specified threshold.

To illustrate this further, assume that a content owner insists that, when viewing his/her content, a user should only be allowed to skip up to 30% of the content. This criterion requires the user to view at least 70% of the content, which, in the absence of 'naturally' missing watermarks, would correspond to a correlation coefficient of exactly 0.7. To account for the naturally missing watermarks and other system limitations, this threshold may be set to a lower value 0.7 k, where k is an adjustment factor (e.g. between 0.5 and 1). Note that, in certain system architectures, it may be possible to unequivocally determine the location and/or fraction of the naturally missing watermarks that are due to the embedding process by performing watermark detection immediately after embedding, and recording the location/fraction of missing watermarks. This information, if communicated to the detectors, can help resolve part of the uncertainty in determining the root cause of missing watermarks. By way of example and not limitation, this information may be a detailed map of missing or embedded watermarks, the embedding strength of individual watermarks, the average embedding strength of watermarks over a predefined duration, the overall fraction of missing/embedded watermarks, or one or more parameters that describe missing/embedded watermarks through a mathematical function. The communication of such auxiliary information may be carried out using the content itself (e.g., as part of a file header, or embedded as additional watermark packets, and the like), or through a separate communication channel (e.g., residing at a database that is accessed by the detector). The correlation coefficient calculations in the above example must also be adjusted to account for, and correct, small signal insertions/deletions that may 'de-synchronize' the detected and embedded stego key patterns. The duration of the host signal for calculating the correlation coefficient is another important consideration. One approach would be to carry out the calculation based on the entire length of the content, another may be to calculate the correlation coefficient for short segments and then average them together; yet another approach may be to calculate the coefficient for 10 short segments and ensure that no more than 3 segments fail the continuity test (i.e., fail to reach the threshold), and so on. The point of this example is not to enumerate all possible statistical measures or methods for their calculation, rather it is to illustrate how the system designer may utilize system requirements to design such statistical parameters in accordance to the general methods of the present invention. Furthermore, while the above example has been described as calculating a correlation coefficient between the entire embedding and detection stego keys, it is understood that similar calculations may be carried using only a portion of the stego keys. For example, it may suffice to confine the analysis to the detected spread spectrum watermarks in one frequency band. In its simplest form, such analysis may comprise counting only the number of detections (regardless of the embedding algorithm, frequency band or other stego key specifics) within a specified content duration.

It is also easy to see how the above example may be 'inverted' to describe the birthday party scenario. In that case, the content owner may not want to allow more than 30 percent of his/her content to be recorded by a camcorder (it may be more meaningful to illustrate this example in terms of a desired duration rather than a desired percentage, e.g., a content owner would like to limit unauthorized viewing/recording of his content to less than 30 minutes). Similar to the previous example, once the content owners and/or system designers have decided on the appropriate distribution and spacing of the allowed 30-minute usage, the above stego key pattern recognition techniques may be appropriately adjusted to deliver the solution. For example, such a decision may dictate that no more than three consecutive 10-minute segments of the content may be present in a camcorder recording. Alternatively, the decision may bar the presence of any three 10-minute segments (whether or not contiguous) in the camcorder recording, and so on. The stego key recognition methods, as described above, may be readily utilized to make any and all of the above measurements possible.

The simple example illustrated using Table 1 also implies that the extractor has an exact knowledge of the embedding stego key, and is thus capable of recognizing discontinuities of the host signal by recognizing the discontinuities in the detection stego key. This assumption is contrary to the security enhancement protocols, disclosed earlier in commonly owned, co-pending U.S. patent application Ser. No. 11/115,990, that advises against such knowledge. This apparent contradiction can be remedied if only a small portion of the embedding stego key is used for continuity detection. For example, only one frequency band may be utilized for continuity determinations. Using this approach, the watermark embedding opportunities in this 'reserved' frequency band may always be embedded (and detected) with the same set of parameters that are known to both the embedder and the detector. This 'reserved' portion of the stego key may be as narrow or as broad as the system security, robustness or transparency requirements allow. For example, in applications where transparency of watermarks is not critical, the number of embedding opportunities may be increased to accommodate the 'reserved' stego key portion.

Watermark Channel Code Modifications

In accordance with another example embodiment of the present invention, signal continuity information may be carried as part of the watermark 'channel' code without reducing the existing watermark payload capacity. Watermark payload bits typically undergo several levels of transformation to generate a string of bits that is suitable for embedding into the host signal. These techniques are well-known in the art of signal processing and digital communications. Such transformations typically comprise encryption, scrambling, error coding (e.g., CRC generation, Reed-Solomon encoding), interleaving, bit modulation coding (e.g., run-length-limited coding), and other possible transformations to generate the so-called channel bits. Channel bits often comprise synchronization headers, as well, that mark channel packet boundaries; synchronization headers facilitate the recognition and recovery of channel packets in presence of noise, jitter and other distortions. The following provides two specific techniques on how to incorporate additional continuity information into channel bits of an existing watermarking system.

A) Channel Bit Modification

The simplest form of packet recovery for copy control watermarks, as disclosed in commonly owned copending U.S. patent application Ser. No. 11/115,990, is to compare the detected pattern of channel packet bits to one or more known patterns that are potentially embedded in the host content. The known pattern that produces the least number of errors (i.e., least number of mismatches with the detected packet bits), given that the number of errors does not exceed an error threshold, is usually chosen as the most likely pattern to have been embedded. In most applications, identical watermark packets, with identical channel bit patterns, are embedded redundantly in the host content in order to improve the reliability of watermark recovery. One method for providing host signal continuity information is to insert an intentional pattern of bit errors into identically embedded channel packets as a means for uniquely identifying each channel packet. This concept may be further illustrated by referring to FIG. 5. Section (A) shows an example series of watermark channel packets 501 that have been normally and continuously embedded in a host content (i.e., the same watermark packet is repeatedly embedded in the content). Each channel packet comprises 105 channel bits, including 5 synchronization bits 502, and 100 packet bits 503 (recall that packet bits are produced by applying several levels of error correction coding, scrambling, encryption, modulation coding and other possible coding techniques to the user payload). Upon the reception of the embedded content through a noisy channel, an appropriately designed watermark decoder applies error correction techniques to correct any erroneous bits (if within the correction capability of the deployed error-correcting-code) and recovers the embedded watermark payload bits. Section (B) corresponds to the same watermark channel packets that have been modified in accordance with the present invention to carry additional continuity information without interfering with the main payload of the watermark packets. The first embedded channel packet of section (B) is the 'nominal' packet 501, identical to the packets 501 shown in section (A). The second packet 504 is different from the nominal packet in one bit location 505 (e.g., location 1, designated with an X), the third packet 506 is different from the nominal packet in a different bit location 507 (e.g., location 2, designated with a Y), and so on. In this example, it is possible to produce 100 different single-bit error patterns and use each pattern to designate an embedding location relative to the nominal packet. In the detection process (and for now assuming that no other bit errors are introduced by the transmission channel), each recovered channel packet may be compared to the nominal packet to recover the location of the mismatched bit, revealing the location of the recovered watermark packet within the sequence of embedded watermarks. As a result, this technique enables the incorporation of a side channel information (e.g., the packet serial numbers described earlier) but without using the "user" payload of the watermark packet. As such, the technique illustrated in FIG. 5(B) allows the recovery of the original watermark payload bits (i.e., the nominal packets) with little or no robustness penalty throughout the content while delivering packet numbers as sub channel information. This is possible since most error correcting codes that are utilized in watermarking systems can tolerate, and correct, the introduced single-bit error in the channel packet bits (i.e., this is equivalent to reducing an Error-Correcting-Code's correction capability by 1 bit, which is typically a small fraction of the overall error correcting capability). At the same time, a sub-channel processor may be developed to independently analyze the recovered packets' mismatch patterns to report the recovered packets' sequencing information.

Figure 5:
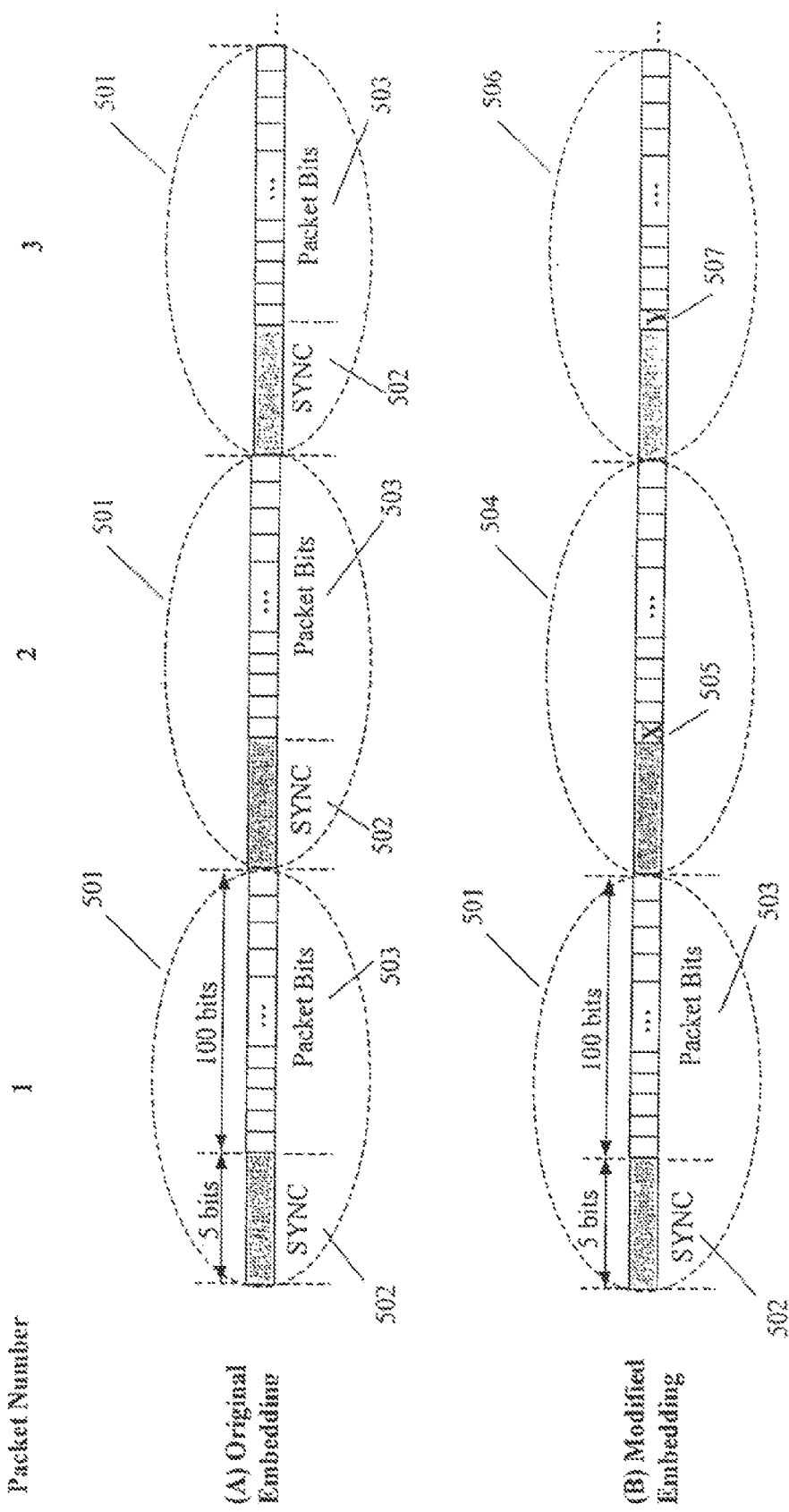
FIG. 5 illustrates continuity assessment using channel bit modification in accordance with an example embodiment of the present invention.

While the example embodiment of the present invention as shown in FIG. 5 is useful for illustrating the underlying concepts, additional modifications may be necessary for proper adaptation of this technique to noisy communication channels. For example, in the presence of additional bit errors (both due to the embedding and the transmission processes), it may not be possible to uniquely identify some or all of the single-bit error patterns. This problem can be solved in two ways. First solution is to allocate more than one channel bit for auxiliary information signaling. The main drawback associated with this method is the reduction in detection robustness of the main watermark payload. Alternatively, or additionally, more than one channel packet may be used to carry the same auxiliary information (e.g., packet numbers). This is certainly feasible if watermark packets are short, the target content is relatively long, and/or multiple layers of watermarks are simultaneously embedded in the host content. For example, it may be possible to embed 10 watermark packets in a 1-second span of a host audio signal by using different frequency bands, autocorrelation delay values, PN sequences, or other parameters of the stego key. In addition, in many applications such as copy control, it is rarely required to detect signal discontinuities with a 1-second granularity. Thus, a series of contiguous watermarks may be used to carry identical channel packet patterns, thereby improving the reliability of recovered information from the sub channel. This improvement in detection reliability comes at a price of reduced granularity in continuity detection. Standard signal processing techniques, such as averaging and various forms of filtering techniques, may be used to provide best estimates of the recovered sub channel data. In addition, standard edge detection techniques may be used to estimate transition boundaries between watermark channel packets that carry different sub code information. The channel bit modification technique, in combination with heartbeat and watermark duration measurement considerations that were described earlier, enables signal continuity detection for various of the above-described applications.

B) Packet Bit Scrambling

Figure 6:
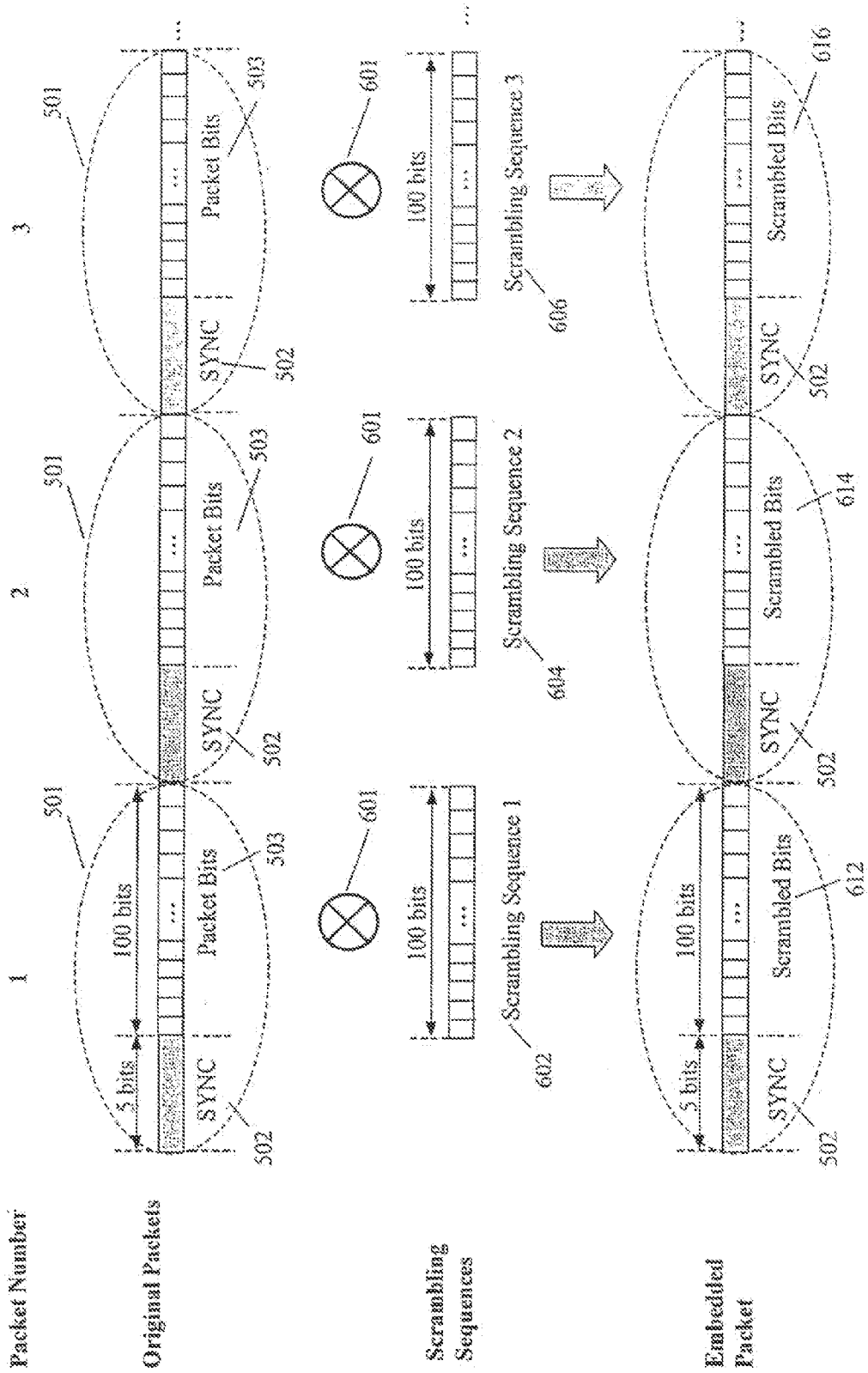
FIG. 6 illustrates continuity assessment using packet bit scrambling in accordance with an example embodiment of the present invention.

Packet scrambling in digital watermarking systems is sometimes implemented to randomly distribute the '1' and '0' bits within a watermark packet. Scrambling is typically implemented by generating a scrambling sequence that "whitens" the ECC-encoded packets (e.g., by XORing bits of the whitening sequence with the corresponding bits of the ECC packet). One method of incorporating continuity information in the embedded watermark packets is to change the scrambling sequence from one segment of the host content to the next segment of the content in a predefined manner (each segment, as described earlier, may comprise one or more watermark packets). Note that this technique may be applied to watermark packet bits regardless of whether or not ECC encoding is part of channel packet formation. FIG. 6 illustrates the basic principles behind packet bit scrambling as a mechanism for signal continuity detection in accordance with an example embodiment of the present invention. The original watermark packets 501 are identical to the ones illustrated in FIG. 5, comprising 5 synchronization bits 502 and 100 packet bits 503. Bits of individual packets are then scrambled using different sets of scrambling sequences (e.g., scrambling sequence 1 (602) is used for scrambling packet 1; scrambling sequence 2 (604) is used for scrambling packet 2; and scrambling sequence 3 (606) is used for scrambling packet 3, etc.). As a result of scrambling, each embedded packet will have a different set of packet bits. Although FIG. 6 illustrates a scrambling method using a simple XOR operator 601, it is understood that more sophisticated scrambling methods known in the art may be used. Using this technique, each watermark packet may be scrambled using a distinct scrambling sequence for the duration of the host content. Alternatively, the scrambling sequences may repeat according to a predefined sequence. For example, 256 distinct scrambling sequences may be used for scrambling 256 contiguous watermarks in a repeating manner, in essence implementing an 8-bit counter without utilizing the main payload of the watermark packets.

On the detection side, the extractor must know the value and the order of different scrambling sequences that are used to effect embedding of the watermark packets (e.g., via a stored look up table or local capability to regenerate the de-scrambling sequences on the fly). In the detection process, the recovered channel packet bits must first be de-scrambled and then ECC decoded (if ECC is implemented) in order to recover the payload bits. In one preferred embodiment of the present invention, the extractor may first try all de-scrambling sequences until the first packet is properly ECC decoded. In the absence of signal modifications, the remaining packets should be recoverable by applying the descrambling sequences in the correct order. A watermark packet that is recovered by an out-of-order scrambling sequence (e.g., a missing scrambling sequence, a duplicate scrambling sequence, or other similar anomalies described in connection with "stego-key recognition" techniques) may be used to estimate the amount of cuts, insertions or segment reordering that has been applied to the host signal. Generation of scrambling sequences is well-known in the art, with most methods utilizing linear feedback shift registers.

Watermark Position Modulation

Additional information may also be incorporated into an existing watermark packet structure using watermark position modulation. This technique uses the relative gaps between the embedded watermarks to incorporate additional auxiliary information into the host signal. This capability to carry additional payload can also be used to incorporate continuity information such as serial numbers into the host signal. Further details of watermark position modulation are disclosed in the commonly owned U.S. Pat. No. 7,024,018.

Sparse Watermarks

Another way of incorporating continuity information in a multimedia content is to embed measuring marks with large, predefined gaps between them. These gaps may used for embedding a different set of independent watermarks (i.e., to carry unrelated payloads such as content identification information), or may be left unmarked to minimize the impact of embedding on content perceptual quality. The separation of these measuring marks should be large in comparison with the maximum discontinuity in an attack scenario (e.g., for a typical feature movie, gaps of duration one to ten minutes are sufficient). Once a suspect content is received, it is examined for the presence of measuring marks. The deviation between the separation of the recovered marks and the predefined embedding separation (within a certain tolerance) can be used to assess the extent of signal discontinuity.

The biggest issue with this approach is the reliability of individual watermark detections. Since the measuring marks are only embedded sparsely throughout the content, a missing mark can significantly increase the uncertainty of discontinuity measurement. Several techniques may be used to improve the reliability of detections. For example, more powerful error correction codes may be used for embedding and recovery of individual watermarks in a higher bit error rate environment. Error Correction Coding (ECC), and the associated detection and recovery techniques, are well known in the art and will not be discussed further. Also note that any improvement in error resiliency of watermark packets should also include improving the error performance of synchronization headers (if present). For example, the header pattern may be increased in length, duplicated, ECC encoded, and the like. Another technique for improving the reliability of detections is to embed a group of watermarks at each sparse location. This may comprise embedding back-to-back watermarks, embedding in multiple frequency bands, using multiple embedding algorithms, or other methods that increase the density of embedded watermarks at a given measuring mark location. For example, in an audio watermarking system with watermark duration of 3 seconds and measuring mark separation of 10 minutes, a group of 10 watermarks may be embedded for 30 seconds, with 9.5-minute gaps between each group of embedded watermarks. Detection of at least one watermark per group is sufficient to enable discontinuity measurement. Clearly, the probability of detecting at least one watermark among ten is much higher than probability of detecting a single watermark. In addition, further improvements may be possible by combining information from multiple watermarks using soft decision decoding, time diversity, weight accumulation algorithm, or other techniques that are described in the co-pending, commonly owned U.S. patent application Ser. No. 11/410,961.

Another consideration associated with embedding a group of watermarks is the identification of group boundaries in a received content. As described earlier in the context of watermark heartbeat detection and packet numbering, packet prediction techniques can improve the detection of precise group boundaries. However, if the detected cluster length is still shorter than expected, this shortcoming may be accounted for by adjusting the time tolerance parameter $\tau$ in equations (2) and (3). For example, if M watermarks are embedded but K are detected, where K<M, then parameter $\tau$ may be increased by $(M-K)*L$ to reflect this limitation in the detection process. Such an adjustment must be done on both sides of a discontinuity measurement.

Sparse embedding may also be combined with the watermark counters described earlier. This combination allows the embedding of sparse watermarks with long periodicity using a counter size smaller than what would have been required for continuous embedding. Note that the detection of small payloads, such as watermark counters, is simpler and more reliable than extraction of larger payloads, such as an embedded movie title. For example, watermark counters may be found by simple matching of an extracted pattern to a predefined template. On the other hand, extraction of an embedded movie title may require error correction algorithms such as BCH or turbo codes. This difference in detection complexity may, however, be exploited to improve the overall system performance. For example, in the presence of both types of watermarks, the detector may initially search for counter watermarks only, and once it detects them, it may then attempt extracting the more complex payloads. This way, the counter-carrying watermarks may be used as synchronization headers for the more complex payloads, thus improving the detection reliability and reducing false positive rates.

Relative Embedding Locations

Figure 7:
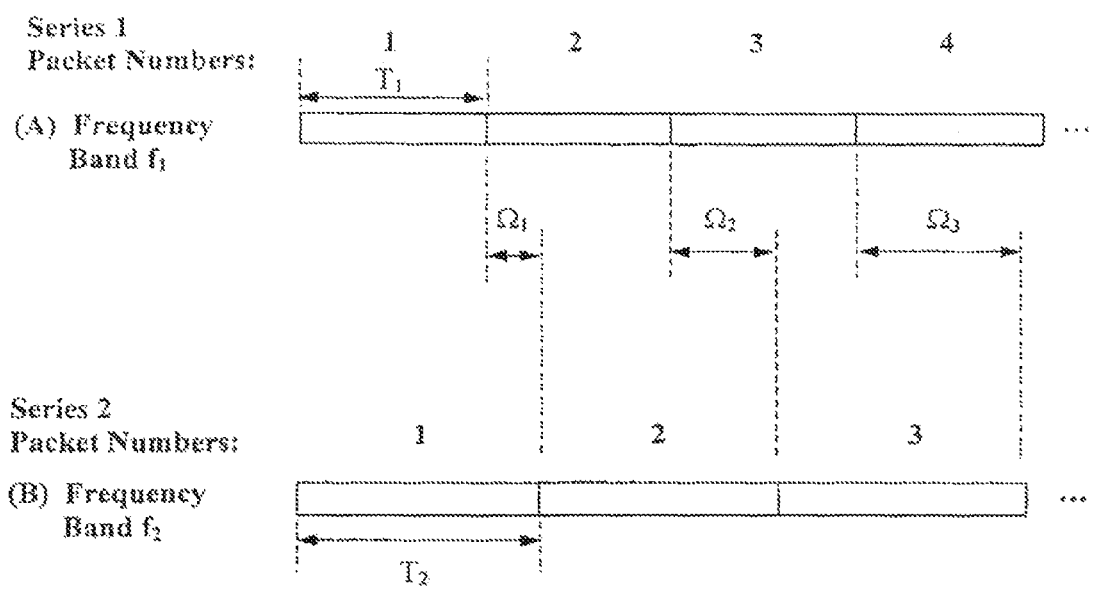
FIG. 7 illustrates continuity assessment using relative embedding locations in accordance with an example embodiment of the present invention.

In order to improve the reliability and robustness of a watermarking system, it is often the case that watermark packets are redundantly embedded throughout a content. Such redundancy is usually effected by embedding in multiple frequency bands, in multiple temporal or spatial locations of the content and/or employing multiple embedding technologies (e.g., spread spectrum, autocorrelation modulation, etc.). The following description illustrates how relative locations of such redundantly embedded watermarks can be used to assess the continuity of a received signal. In order to facilitate the understanding of the foregoing description, a one-dimensional embedding example is used to develop the basic concepts, as shown in FIG. 7. FIG. 7 illustrates (A) a series of watermarks, with duration $T_1$, that are embedded in one frequency band, $f_1$, of an audio signal, and (B) another set of embedded watermarks, with duration $T_2$, in a different frequency band, $f_2$, of the audio signal. Since watermark durations $T_1$ and $T_2$ are different, the two set of embedded watermarks lose their time alignment after the very first watermark packet. Depending on the specific values of $T_1$ and $T_2$, however, they may regain their alignment at some specific time in the future. For example, if $T_1$ and $T_2$ are 8 and 10 seconds, respectively, this realignment occurs every 40 seconds. But if $T_1$ and $T_2$ are 9.8 and 10.2 seconds, respectively, the perfect alignment occurs every 499.8 seconds (note that a close-to-perfect realignment also occurs at every other 249.9 seconds). It should be noted that while this example only uses two series of watermarks for illustration purposes, many practical systems may have more than two series of watermarks that are embedded in the same or different frequency bands, using different algorithms and stego keys.

Figure 8A:
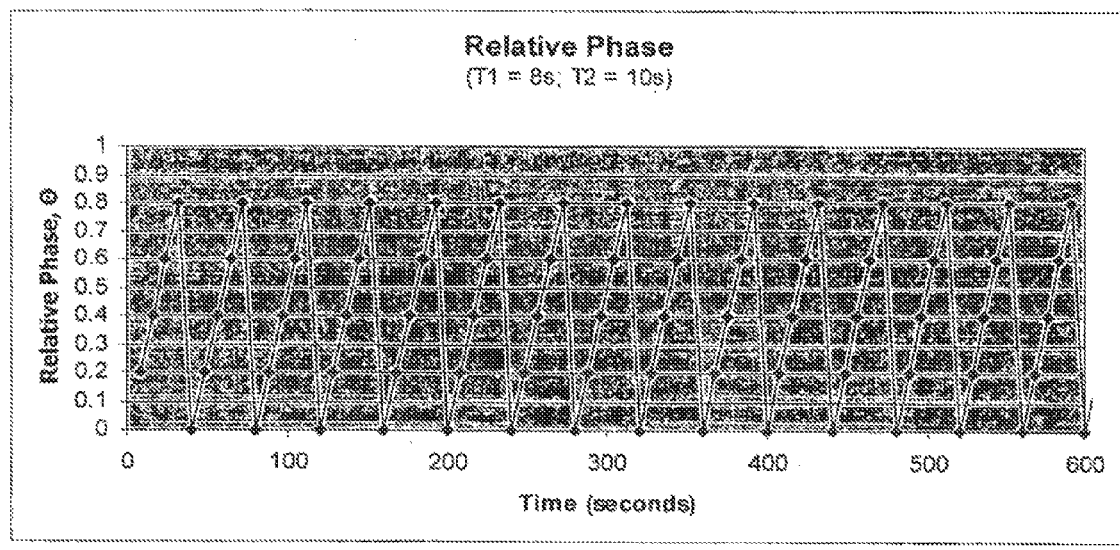
FIGS. 8A through 8E illustrate continuity assessment using relative embedding locations in accordance with an example embodiment of the present invention.
Figure 8B:
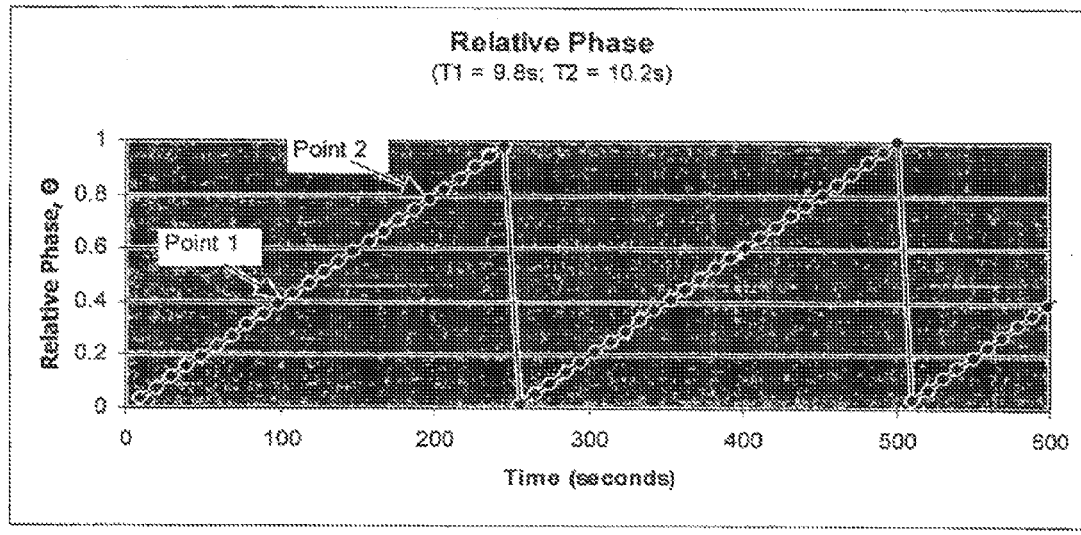
Figure 8C:
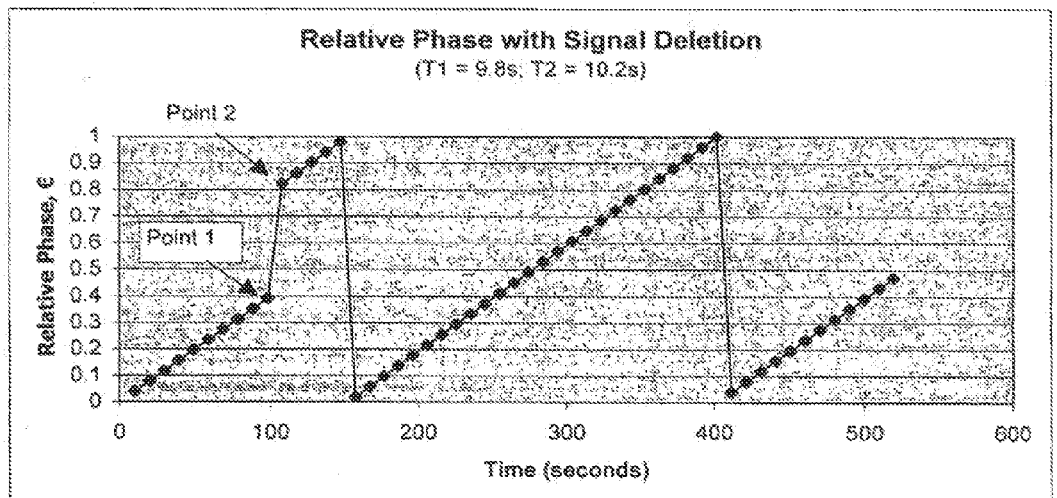
Figure 8D:
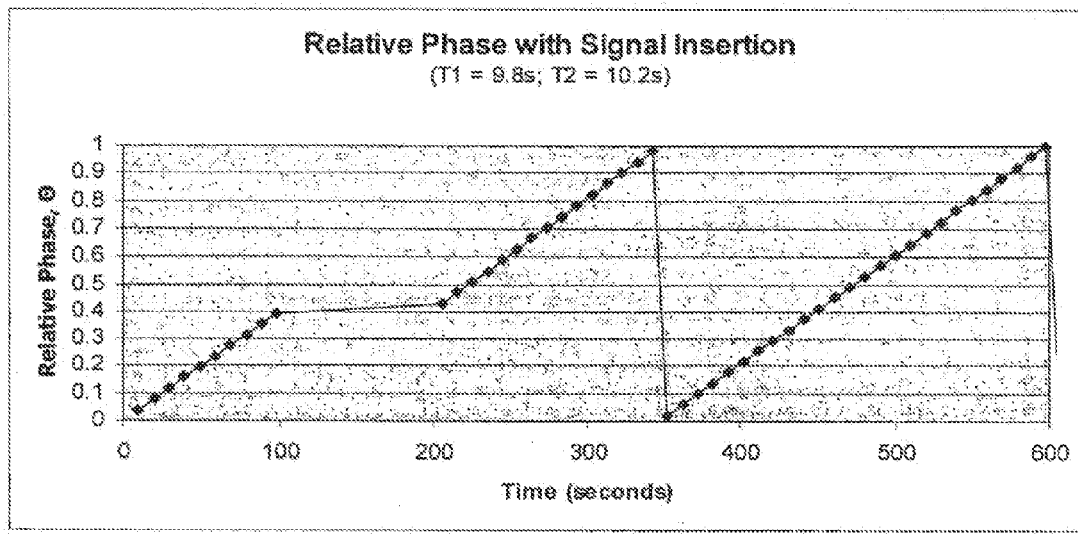

It is also easy to see that at any instant in time the relative locations of any two watermark packets can be predicted and characterized. This is illustrated by defining a 'relative phase' between the two sets of watermark packets as follows:

$$\Theta = \Omega/T_2 \quad (5);$$

Where $\Omega$, as shown in FIG. 7, is defined as the time difference between watermark points in the two series. FIG. 8(A) through 8(E) illustrate how the relative phase varies as a function of time in a continuously embedded host signal. In FIG. 8(A) this variation is plotted for $T_1$ and $T_2$ of 8 and 10 seconds, respectively. FIG. 8(B) illustrates relative phase variations for $T_1$ and $T_2$ values of 9.8 and 10.2 seconds, respectively. In the presence of a signal discontinuity, however, the relative phase of detected watermarks departs from the expected behavior of FIGS. 8(A) and 8(B), but in fact, this departure can be used to determine the extent of signal deletion or insertion. FIG. 8(C), for example, illustrates the relative phase values in the presence of a 100-second cut in the host signal of FIG. 8(B) (i.e., host signal segment, starting at 100 seconds and ending at 200 seconds, is removed). FIG. 8(D) shows a similar plot but in the presence of a 100-second signal insertion (i.e., an un-embedded signal is inserted at time=100 seconds). As evident from the plots in FIGS. 8(C) and 8(D), in order to determine the presence and the extent of a discontinuity, it suffices to examine the relative phase values at discontinuity boundaries. One example procedure for making such determination involves calculating the relative phase of successively detected watermarks, and determining if they fit the profile of expected relative phase values. In case of a divergence, the extent of discontinuity can be determined using the plots similar to those of FIGS. 8(A) through 8(E), or their mathematical equivalents. For example, comparing FIGS. 8(B) and 8(C), it is evident that all points up to point 1 are in agreement. But once a departure from the expected value is detected at point 2 of Figure (C), the corresponding point 2 in FIG. 8(B) can be readily located and used to estimate the amount of signal deletion. It should be noted that the expected relative phase behavior can be communicated to the detector in different ways. Since the expected phase relationship can be completely reproduced once $T_1$ and $T_2$ values are known, these parameters can be 'hard-coded' into the detector if watermarks of fixed duration are utilized in the watermarking system. Alternatively, or additionally, $T_1$ and $T_2$ values may be communicated as part of the watermark payload, or through another communication channel in order to enable system upgrades and modifications to the watermarking stego key.

One limitation associated with the above signal continuity assessment method is that cuts or insertions that are greater than the period of relative phase cannot be uniquely identified. For example, examination of FIG. 8(C) reveals that the cut can have any one of durations (100+n*250), where n=0, 1, 2, 3, . . . , and 250 is the period of relative phase associated with FIG. 8(B). Similarly, using the watermark packet structure associated with FIG. 8(A), any cut or insertion that is estimated to have duration 'd' may in fact have any one of durations (d+n*40), where 40 is the period of relative phase associated with FIG. 8(A), and n=0, 1, 2, 3, . . . . One solution is to select the packet durations in such way that the 'folding' of relative phase is avoided for all practical durations of the host content. For example, the packet structure with relative phase relationship of FIG. 8(B) is perfectly suitable for music files that are typically 3 minutes long since the relative phase value is guaranteed not to repeat for such short durations. At the same time, this packet structure may also be suitable for embedding movie soundtracks since cuts or insertions that are longer than 250 seconds are likely to significantly diminish the value of the content to the point that their unique identification may be of no importance to the content owner. Another solution for uniquely identifying the duration of a cut or insertion is to utilize the relative phase information from more than 2 series of watermarks. For example, the information contained in FIGS. 8(A) and 8(B) may be analyzed together to make this possible. In particular, while all cuts or insertions of duration (d+n*250) produce the same relative phase discontinuity in watermarks of FIG. 8(B), each such cut or insertion produces a unique relative phase discontinuity in watermarks of FIG. 8(A). The combined analysis of multiple relative phase relationships also improves the granularity and/or certainty of discontinuity measurement. For example, the relative phase relationship of FIG. 8(B) may be used for ascertaining the extent and location of a discontinuity at a courser level while the phase relationship of FIG. 8(A) may be used to further pinpoint the extent of such discontinuity with a finer granularity.

Figure 8E:
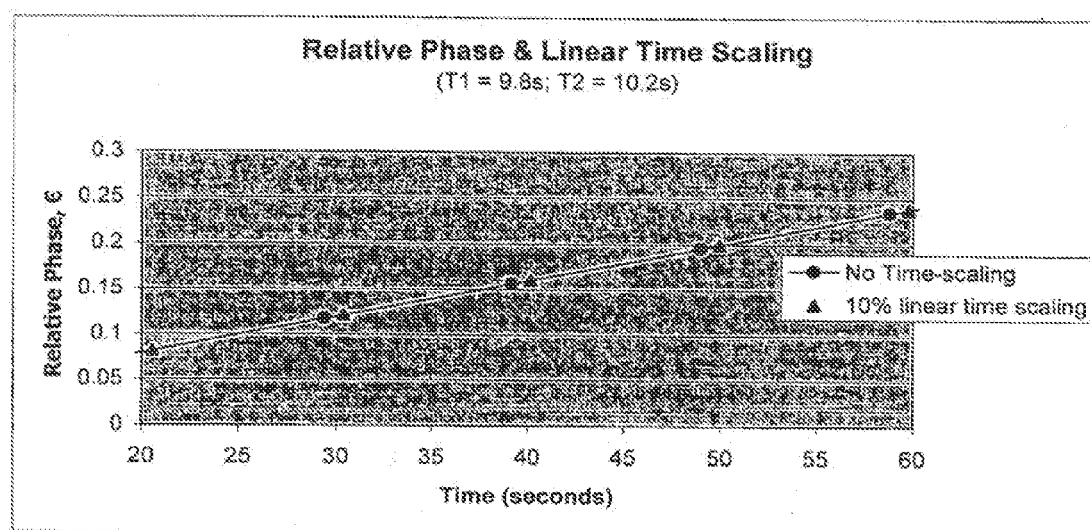

As previously described in connection with watermark heartbeats, the watermark detection process is also inherently prone to certain time measurement uncertainty; in addition, the detection system may have to tolerate certain levels of additional time-scaling in the host signal in order to accommodate possible legitimate signal processing operations. These factors may also place limitations on the accuracy of relative phase determination and the predicted time alignment of watermark packets. Fortunately, any time-scaling operation is very likely to affect contemporaneous watermark packets in a similar fashion, and thus it may be systematically taken into account when relative phase calculations are conducted. For example, FIG. 8(E) illustrates the movement of relative phase points in the presence of +10% linear time-scaling for the system that was originally shown in FIG. 8(B). Thus any such time-scaling uncertainty can be translated into error tolerances around the 'nominal' values of the relative phase. Alternatively, if the amount of time-scaling is known (e.g., through examining the length of recovered watermark packets, their spacing, or other methods), the relative phase calculations may be adjusted to reflect the exact amount of time-scaling.

Figure 9:
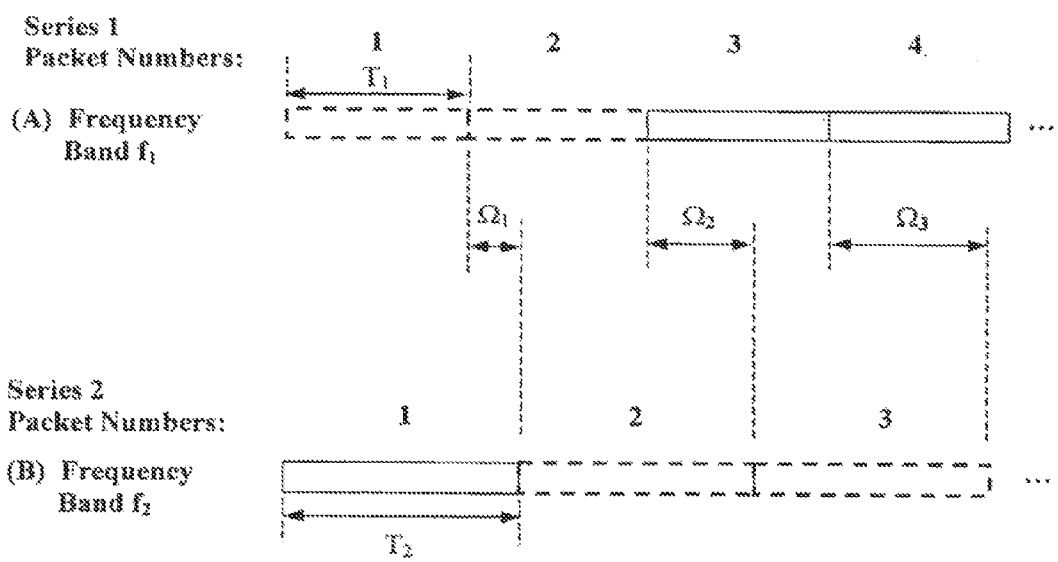
FIG. 9 illustrates continuity assessment using relative embedding locations and packet projection in accordance with an example embodiment of the present invention.

As illustrated in FIGS. 8(A) through 8(E) and equation (5), the calculation of each relative phase value requires the presence of two watermarks (i.e., one from each series). In a preferred, and more reliable, method of calculation that is shown in FIG. 7, the two watermark packets have overlapping portions in time. However, due to inherent limitations of the embedding process as well as the presence of noise or other impairments in the received host content, not all watermark packets may be recovered. In such cases, relative phase calculations may still be carried out by projecting the locations of watermarks forward or backward in time, and then calculating the relative phase value in accordance with equation (5). This technique is illustrated in FIG. 9, which is similar to FIG. 7 except that missing watermark packets are represented by dashed lines. Obviously, the projection cannot be extended too far due to the potential presence of cuts and/or gaps in host signal. One method for improving the reliability of such projections is to use additional watermark packets to confirm the accuracy of the projection. Another improvement may involve a two step process. As a first step, the presence or absence of possible cuts or insertions in the host signal is verified using other techniques, such as watermark heartbeat detection. Then, as a second step, only the watermarks that conform to the correct heartbeat (or other continuity measure) are used for forward/backward projection. Using this two-step approach, the projection of watermarks across any discontinuity is avoided.

The above two-step watermark projection method illustrates one example of how multiple continuity detection techniques can be combined to improve the overall continuity assessment. Another improvement involves combining the relative location calculations with the insertion of packet serial numbers (or counters) into the watermark payload. This combination overcomes the limitation of not being able to uniquely identify host signal cuts or insertions due to periodicity of relative phase calculations. At the same time, it requires only a small counter size, which results in payload capacity savings. For example, let's assume that a 4-bit counter is used as part of the payload of watermarks with relative phase behavior of FIG. 8(B). Although this counter can count up to 16 numbers, let's assume that it is used to count up to only 14 in 'series 1' watermarks (i.e., with $T_1=9.8$ seconds), and up to 16 in 'series 2' watermarks (i.e., with $T_2=10.2$ seconds). Let's further assume that a 100-second cut, such as one illustrated in FIG. 8(C) has been identified using the relative phase calculations previously described. The question is whether this cut represent a 100-second or, say, 350-second discontinuity. Recall that such a cut can have a length equal to (100+n*250), for n=0, 1, 2, . . . . This determination can be done using packet numbers associated with watermarks at both sides of the discontinuity. Table 2 provides counter values at the starting point of discontinuity (i.e., at time=100 seconds), and at potential ending points of discontinuity, namely at (100+n*250) seconds, for n=0, 1, 2. The notation (X, Y) is used to represent counter values X and Y, corresponding to 'series 1' and 'series 2' watermarks, respectively. It is evident from Table 2 that once packet numbers/counters are recovered from a received host signal, they can be compared against the potential boundary points of Table 2 to uniquely determine the size of discontinuity.

TABLE 2

Example Watermark Counter Values at Potential Discontinuity Boundaries

| Count @ 100 s (Start of Continuity) | After 100 s (n = 0) | After 350 (n = 1) | After 600 s (n = 2) |
|---|---|---|---|
| (10, 10) | (6, 4) | (7, 2) | (6, 12) |

Note that in accordance with the above method, the discontinuity can be generally identified by using counter values from one or more watermark series. Examination of Table 2, for example, reveals that 'series 2' counter values alone were sufficient to uniquely identify the discontinuity. Similarly, counter values from more than two watermark series can be examined to improve the reliability of identification.

While the use of relative embedding locations has thus far been described using a one-dimensional example, these techniques can be readily adapted by a person skilled in the art to accommodate multi-dimensional watermarks. For example, in a 2-dimensional image watermarking system, time domain in the preceding analysis may be replaced by a two-dimensional spatial domain. In addition, the phase relationship formulation, such as the one represented by equation (5), may be expanded to govern the relationship among three or more series of watermarks.

Staggered Embedding Schemes

The use of staggered serial numbers (or counters) in different watermark series was briefly introduced above as a tool for improving the determination of relative phase values. This technique may also be used in other ways to improve discontinuity measurements in practical watermarking systems. In applications where the embedded host signal is prone to noise contamination, it is often required to redundantly and contiguously embed identical watermark packets to improve the reliability of their detection. On the other hand, when serial numbers (or counters) are incorporated into the payload of watermarks, adjacent packets will no longer have identical bit patterns. A compromise approach may involve embedding a series of identical watermarks (i.e., with the same packet number) for a certain duration or spatial extent (i.e., the 'repetition segment') before embedding the next series of watermark packets with a different packet number, and so on. With this approach, the improvement in detection reliability comes at the expense of loss of granularity of discontinuity measurement. This loss, however, may be partially mitigated by using staggered packet numbers in systems that implement multiple watermark series (or layers). In such a system, it is often the case that watermark packets belonging to different layers are embedded using different algorithms with different watermark durations or spatial extents, and in different frequency bands. As a result, watermarks that correspond to different layers may require different repetition segments (both in terms of the number watermark packets, and the host signal real estate) in order to produce the same level of detection reliability.

Figure 10:
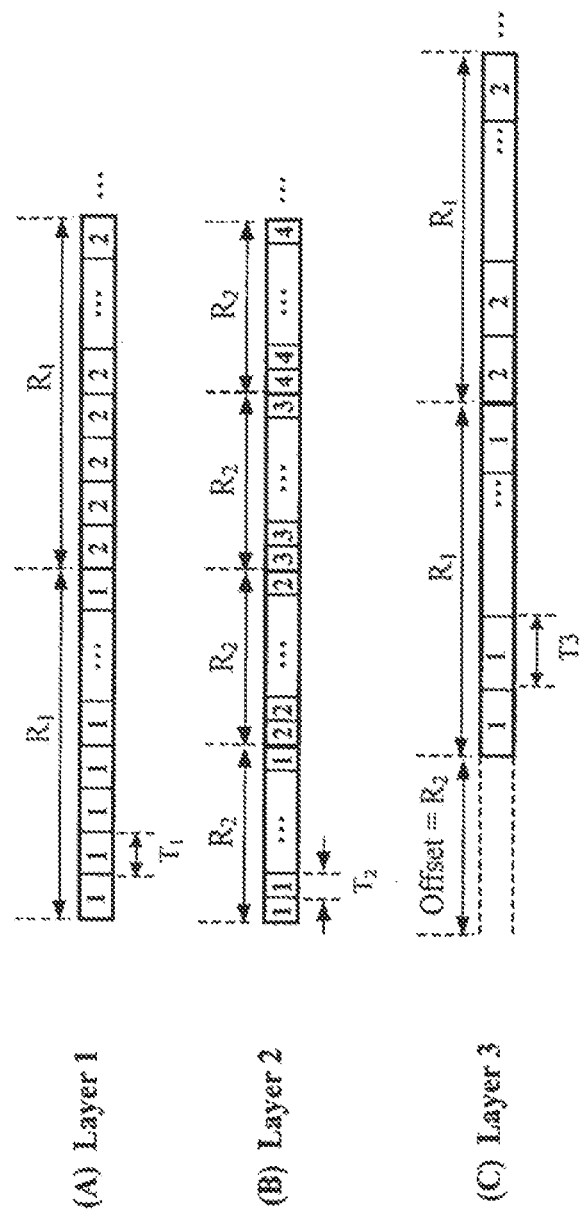
FIG. 10 illustrates continuity assessment using staggered numbering in accordance with an example embodiment of the present invention.

FIG. 10 illustrates an example scenario where several staggered packet numbering schemes are used to increase the granularity of signal continuity detection. In FIG. 10, watermark layer 1 (A) represents the back-to-back embedding of watermarks of duration $T_1$ and repetition segment Rt. Each embedded watermark payload comprises a packet number field (e.g., an N-bit counter) that increments from one repetition segment to the next. Using the watermark packet structure of watermark layer 1 (A), it is thus possible to uniquely identify segments of the host content over a span of $(R_1 * 2^N)$ with $R_1$ granularity. In FIG. 10, watermark layer 2 (B) illustrates the back-to-back embedding of watermarks of duration $T_2$ and repetition segment $R_2$. Using the watermark structure of watermark layer 2 (B), segments of the host content over a span of $(R_2 * 2^N)$, with $R_2$ granularity, can be identified. When both watermark layers are embedded in the host content and are analyzed together, it becomes possible to identify host content segments with the higher granularity of watermark layer 2 (B), namely $R_2$, over the longer span of the host content $(R_1 * 2^N)$ of watermark layer 1 (A). Note that the values of $T_1$ and $T_2$ do not affect the above granularity determination as long as the ratio of $R_1$ to $R_2$ is maintained. As previously mentioned, watermarks in different layers may have completely different embedding characteristics and robustness profiles. Thus it may be possible to have different watermark durations and repetition segment durations to achieve the desired detection reliability. FIG. 10, watermark layer 3 (C) shows another variation of the above technique in which the repetition segment is identical to that of FIG. 10, watermark layer 1 (A) but the start of embedding is offset by an initial value equal to $R_2$. Combining the staggered watermark pair of watermark layer 1 (A) and 3 (C), it becomes possible to uniquely identify segments of the host content over a span of $(R_1 * 2^N)$ with $R_2$ granularity. Obviously, the granularity and span of host signal identification may be further improved by increasing the number of layers with multiple staggering offsets and repetition segment ratios.

Broadcast Monitoring Applications

Signal continuity detection in a broadcast monitoring application can also benefit from the presence of packet numbers. In such systems, the detected watermarks are analyzed to assess the start time, duration and broadcast frequency (i.e., repetition) of the particular programming segment, and these measurements are compared to the expected timing and frequency that has been stipulated in a programming schedule or contract. The ConfirMedia Broadcast Monitoring System (BMS) is one such system. Detailed description of the ConfirMedia BMS and related on-line derivatives may be found in commonly owned, co-pending U.S. patent application Ser. Nos. 10/681,953 and 11/501,668. In brief, the Confirmedia BMS uses Event Airplay Receivers (EARs) at different geographical locations within the United States to monitor several thousand radio and television station programs. Some or all of the broadcast programs that are received by the monitored stations have been previously embedded with watermarks. During the embedding process, metadata files are usually generated and stored at a ConfirMedia database that contains certain attributes of the particular embeddings. For example, these metadata files (or embedder logs) may contain the embedder ID, serial number, time of embedding, duration of embedding, title of the segment, and other relevant information. The embedder logs may be used to establish a connection between the detected watermarks and a particular program segment and its attributes. The EARs forward airplay detections to a Media Description and Airplay Transaction (MDAT) subsystem for further data reduction. The airplay detections are known as "arrivals" and an Arrival-to-Event Converter (AEC) runs periodically to convert these arrivals into Aggregated Content Records (ACR), which contain a more meaningful representation of the aired program. The aggregation is done by combining content descriptive metadata collected from the embedder logs with attributes of the detection, applying business logic, and creating events that can be reported to customers.

The ensuing description provides a detailed example of how the various information fields recovered from the embedded watermarks, the associated information residing at a database or other accessible storage media, and the spatial/temporal relationships between the recovered watermarks are combined in accordance with the appropriate business logic to track and report broadcast times and durations of various programs in the presence of channel noise or intentional manipulations which may result in insertions, deletions and re-ordering of the broadcast program.

In monitoring broadcast programs, with typical durations of a few minutes to a few hours, it may be necessary to report whether a program segment has been truncated, or if portions of the program have been interrupted, or played out of order. This functionality may be implemented by tailoring the watermark packets to contain a serial number. For example, a 20-bit field may be allocated for embedding a serial number that increments every 5 minutes throughout the duration of the program. These individual auto-incrementing payloads may then be detected by the EARs, converted into events, and reported as discrete regular events within MDAT. Each individual 5-minute segment may be described by its own Embedded Content Records (ECRs) that contain metadata that supports business logic and enables the creation of meaningful reports for the ConfirMedia customers. FIG. 11 shows an ECR in an exemplary embodiment of the present invention. Section (A) represents the time axis corresponding to the duration of content with 1-minute granularity: Section (B) shows a series of exemplary ECRs associated with consecutive 5-minute sections of the embedded content. Each exemplary ECR comprises several data fields, some of which are shown in FIG. 11 as a Content ID (CID) field (that is incremented every 5 minutes), an Encoder Sequence (that is also incremented every 5 minutes starting from the beginning of the program), the Starting Encoder Sequence, and the Duration information. While it may be possible in some cases to embed the entire ECR into a host content, in most practical systems, with limited watermark payload capacity, only portions of an ECR is carried within the embedded watermarks. These portions must, however, uniquely identify the corresponding ECR upon the recovery of watermark payloads from a received content. In the example embodiment of FIG. 11, the CID field and/or Encoder Sequence may qualify for such embedding. Alternatively, an entirely new representation of an ECR may be selected for embedding into the watermark packets. For example, such representation may be a hash value calculated over all (or some) portions of the ECR, or other mathematical representations that provide a one-to-one mapping between the embedded watermarks and ECR data fields.

A segment is the unit of media tracked by the customer. It is the unit of media embedded in a single input file to the embedder, which may be described by more than one ECR when the segment duration exceeds the ECR duration (e.g., 5 minutes). An exemplary segment and the associated Aggregated Content Record (ACR) is shown in section (C) of FIG. 11. The ACR may comprise an Aggregated Content ID (ACID), the Starting and Ending Sequence values, a list of CIDs associated with constituent ECRs, segment duration information, and additional fields that are not shown in FIG.

11. In order to facilitate the formation of an ACR, a common key field may also be selected/or generated to identify and associate all constituent ECRs. For example, this field, which may or may not be part of the watermark payload, may simply be the starting sequence value. Similar information may also be stored in the embedder logs and made available to the MDAT.

Figure 12:
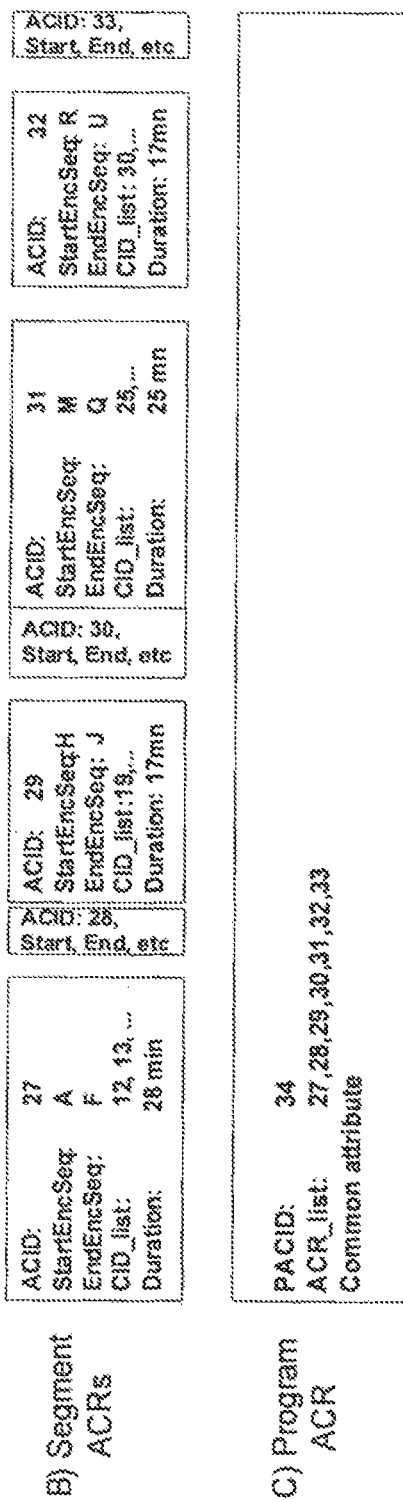
FIG. 12 illustrates segment content records and a program aggregated content record associated with an embedded content in accordance with an example embodiment of the present invention.

A "program" from the viewpoint of a ConfirMedia consumer (e.g., a broadcaster, syndicator, or media outlet) may in fact be comprised of several distinct segments. In some cases, the consumer may be interested in tracking individual segments separately. For example, a syndicator may provide breaks between segments of a program for local commercials or station identification, and may be interested in tracking such segments separately. On the other hand, if a ConfirMedia consumer does not wish to track different subsections of the program separately, then the program in its entirety may be embedded as a single segment and tracked. So in some applications, content tracking and identification is performed at the level of the program as a whole, and in others it is performed at the segment level. This creates a two-level hierarchy of records, namely the Segment ACRs and a Program ACR that describes the list of Segment ACRs in the overall program. FIG. 12 shows an example Program ACR. Section (A) represents a time axis corresponding to the duration of content with 5-minute granularity. Section (B) shows several full and partial segment ACRs, and Section (C) illustrates a Program ACR comprising a Program Aggregate Content ID (PACID), the list of constituent ACR ACIDs, and a Common Attribute, which similar to the common key field described in connection with Segment ACRs, represents a common attribute among all ACR's that are associated with the program. An example of such a common attribute may be the Program Title. Such ACR creation process may also take place using the embedder logs available to the MDAT.

Regular Events:

The raw detections produced by the EARs must be processed prior to their availability for customer reporting. The major processes involved in creation of reporting events comprise association of detections with ECRs, station ID assignment, aggregation of small detected fragments into records that more accurately represent the media spot, aggregation of detections that come from stations monitored by more than one channel or monitoring device, processing detections when the same spot is played back to back, and the like. The AEC is responsible for event creation, and is scheduled to run at regular intervals. The process of regular event creation includes two choices of aggregation: gap or offset (or both). Gap aggregation refers to the process of examining the incoming detections (i.e., arrivals), identifying the gaps (i.e., segments of the received content with no detected watermarks, but located between two segments with detected watermarks), and deciding whether or not to classify the gaps as part of the originally broadcast content. Offset aggregation differs from gap aggregation in that the arrivals may indicate a longer than expected event duration, in which case, the decision has to be made as to whether the detected offset is within the allowed tolerances of the detection system or it represents a back-to-back broadcast of the same segment. In case of the latter, a reverse aggregation procedure must be employed in order to split the arrivals into separate events.

Synthetic Events:

Synthetic events are event records that are created by applying business logic to one or more regular events. For regular program events, the AEC performs gap aggregation (i.e., aggregating back-to-back events with gaps of up to a particular duration). It also performs redundant station aggregation (i.e., combining detections of the same broadcast program that are obtained from more than one monitoring unit) and reverse aggregation (i.e., breaking up longer than expected broadcast events that are the result of back-to-back airing of the same commercial/program). Synthetic event creation is conducted after the creation of regular events and may be accomplished by collecting sets of regular events, calculating relative start time offset and truncated end time (if any), and calculating the event density. The density measure calculated for each synthetic event represents the proportion of gap-less regular events within each synthetic event.

Figure 13:
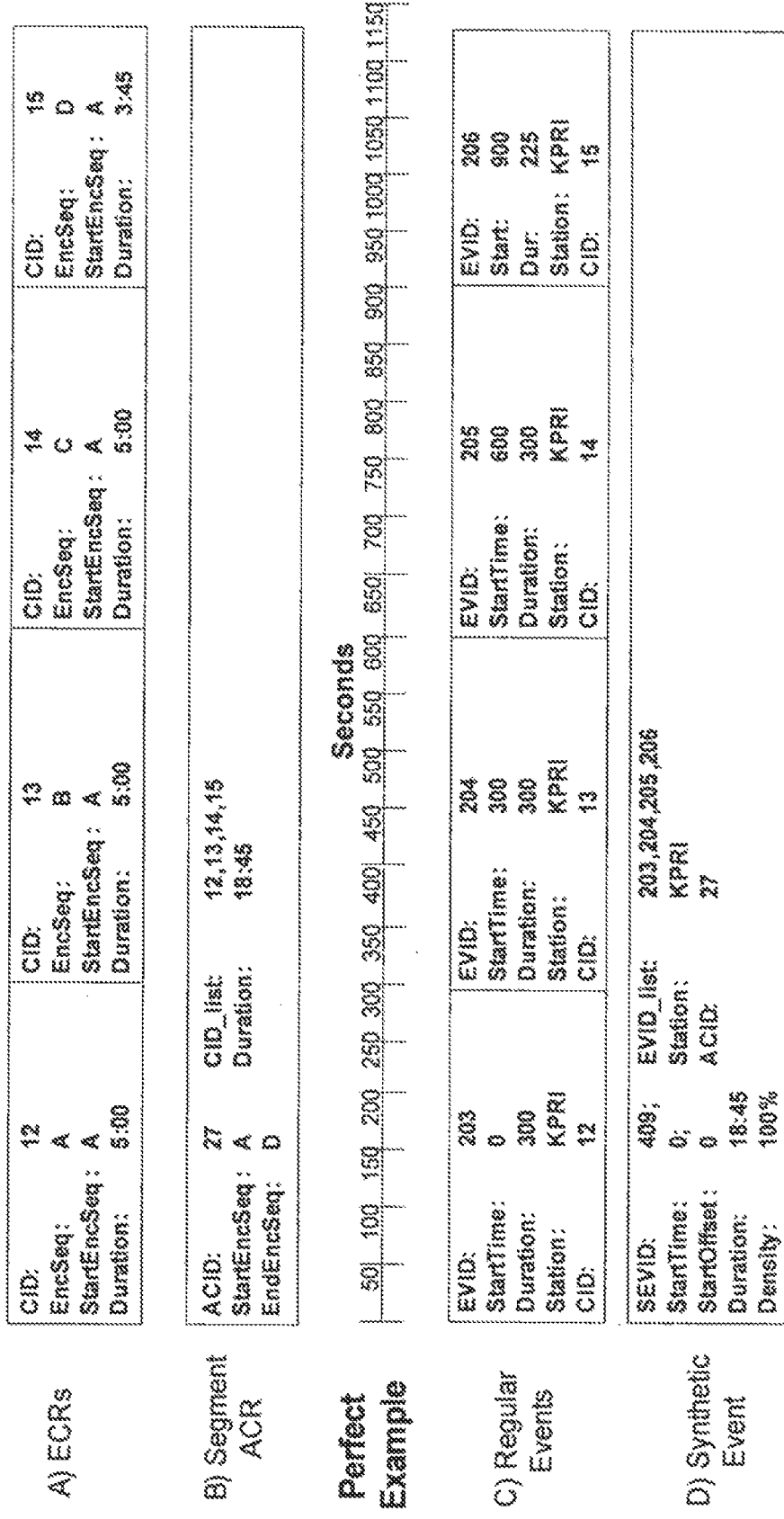
FIG. 13 illustrates synthetic program aggregation in accordance with an example embodiment of the present invention.

Synthetic Program Event Aggregation:

Aggregation may be accomplished by spanning the gaps within or between sequential regular events in order to generate synthetic events. The synthetic event gap parameter may be configurable per media type, and may, for example, be passed to the AEC by a configuration file. An example embodiment of the present invention involving Synthetic Event Aggregation of simple gaps is illustrated in FIG. 13. Sections (A) and (B) show a series of ECRs and the corresponding segment ACR. Sections (C) and (D) illustrate the generation of a synthetic event when perfect regular events are present. In section (C), the detected watermarks are aggregated perfectly to form complete regular events. Each regular event may be identified using information such as an Event ID (EVID), start time of the event, duration of the event, broadcast station call sign, and the recovered CID value. In this perfect example, there is no need for applying any gap or offset compensation logic. The resulting synthetic event may be identified by, for example, a Synthetic Event ID (SEVID), a start time, a start offset, duration information, list of constituents Event IDs, broadcast station call sign, Aggregated Segment ID, and Density of events, and other fields.

Figure 14:
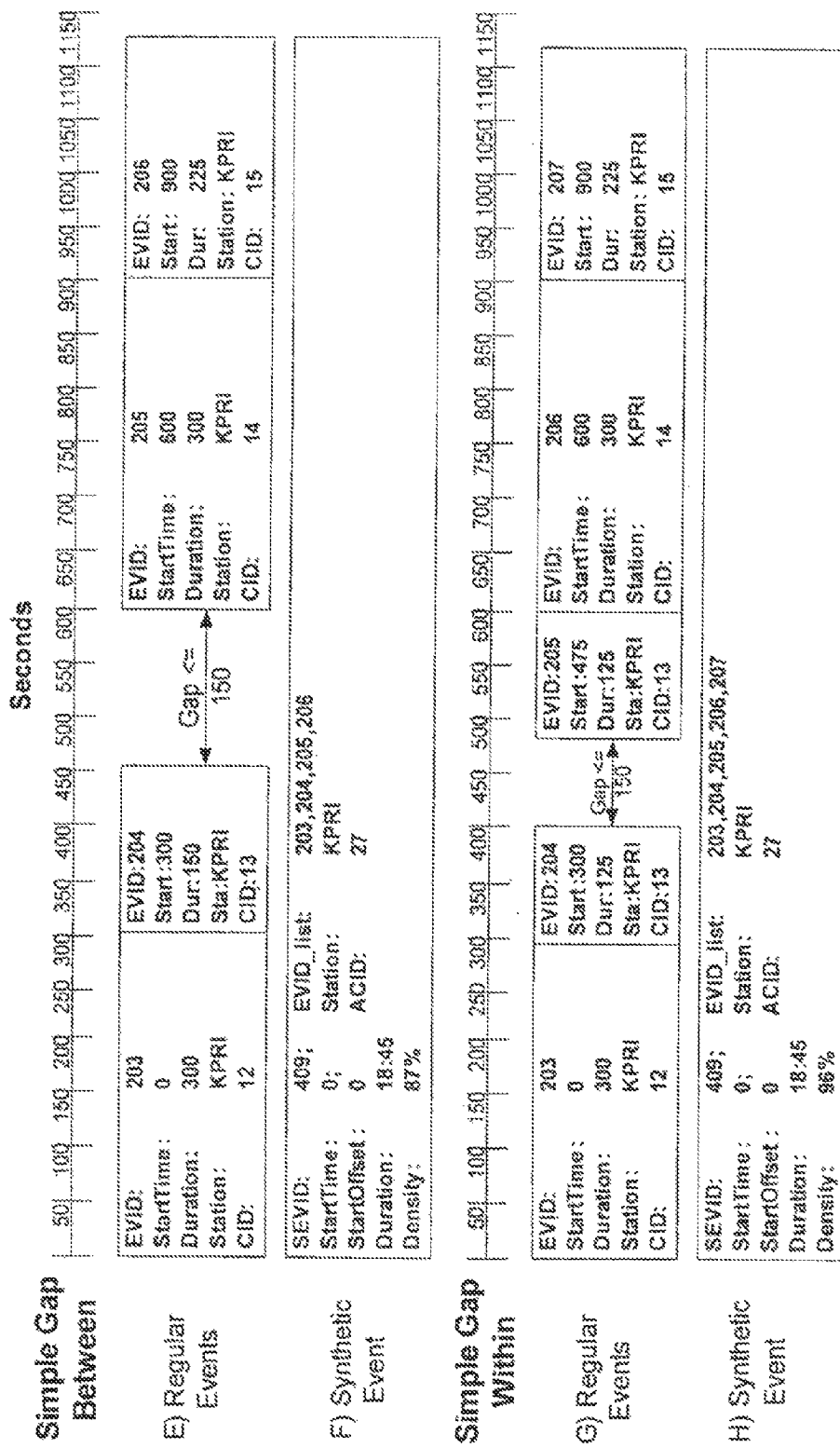
FIG. 14 illustrates synthetic program aggregation in accordance with an example embodiment of the present invention.

An example embodiment of the present invention involving Synthetic Event Aggregation of simple gaps is illustrated in FIG. 14. Sections (E) and (F) illustrate synthetic event aggregation in the presence of a gap between regular events. In this specific example, the event generation logic is configured to bridge the gaps that are less than 150 seconds long. The specific value of this maximum gap parameter is a design choice that depends on customer requirements, the reliability of the watermark detection system and other considerations. Sections (G) and (H) similarly illustrate synthetic gap aggregation in the presence of gaps within regular events (i.e., two or more fragmented events corresponding to the same ECR are detected). Note that the calculated density values associated with sections (F) and (H) are 87% and 96%, respectively, which represent the presence of gaps with durations of approximately 145 seconds and 45 seconds.

To further illustrate the details of synthetic program aggregation, the aggregation process may be started by collecting all regular events that occur on the same station and share the same ACR. This process includes adding regular events to the synthetic event as long as the order of events and any existing gaps "make sense". The precise definition of what makes sense may determined based on customer requirements, the inherent capabilities of the watermarking and broadcast monitoring systems, the cost associated with such determination, and other factors. In general, the aggregation of regular events makes sense when they are not too far off from their expected positions in time. The following step by step procedure represents an example method for determining what "makes sense:"

1. Consider the set of all regular events that share the same station ID and ACR.
   a. Order the set according to ascending detection time, and assign an order index.
   b. For the purposes of this example, consider the regular events numbered 1, 2, . . . , N as they would have occurred if all ECRs defined in the ACR were present.
   c. Create a new synthetic event record and add the earliest regular event to it.
2. Define the following shorthand notation:
   a. I=Number associated with the current event;
   b. J=Number associated with the next event;
   c. E=I's end time;
   d. S=J's start time;
   e. R=The program ECR length (e.g., 300);
   f. G=The synthetic event gap parameter (e.g., 150);
   g. T=The time accuracy tolerance for programs (e.g., 30).
3. Keep adding regular events to the synthetic event as long as the next regular event has an order index greater than the previous one, and as long as the following holds true:
   a. $ABS(((J-I-1)*R)-T)<=(S-E)<=((J-I-1)*R)+((J-I)*G)+T$; where ABS represent the 'absolute value' of the quantity.
4. When the above formula no longer holds true, close the synthetic event and return to Step 1.

Figure 15:
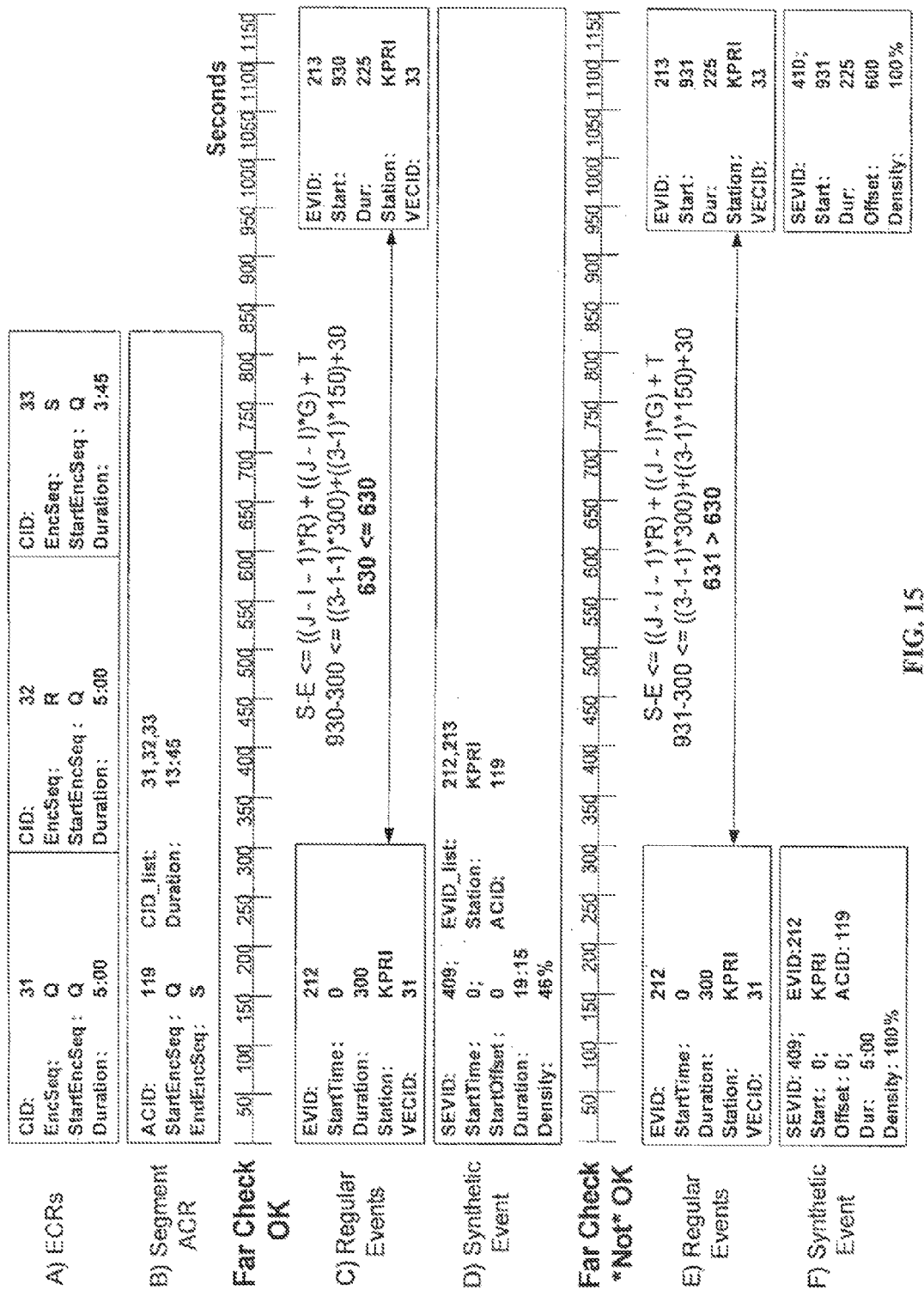
FIG. 15 illustrates synthetic program aggregation in accordance with an example embodiment of the present invention.

FIG. 15 illustrates the application of above described procedure to several synthetic event example scenarios. Sections (A) and (B) show the sequence of ECRs and the associated segment ACR corresponding to the original broadcast program. Section (C) shows two regular events, separated by 630 seconds, that are produced after the detection of broadcast program, subsequent recovery of watermarks, and generation of the regular events. Since this separation is within the allowed separation calculated in accordance with step 3, a single synthetic event, as illustrated in section (D), is produced. Section (E) is similar to section (C) except for a different separation value of 631 seconds. Since this separation falls outside the range calculated in accordance with step 3, two separate synthetic events are produced and reported as shown in section (F). Note that in step 3, an upper and a lower range of separation values are calculated. FIG. 15 illustrates the scenario where the upper range becomes relevant (this is known as the "far check").

Figure 16:
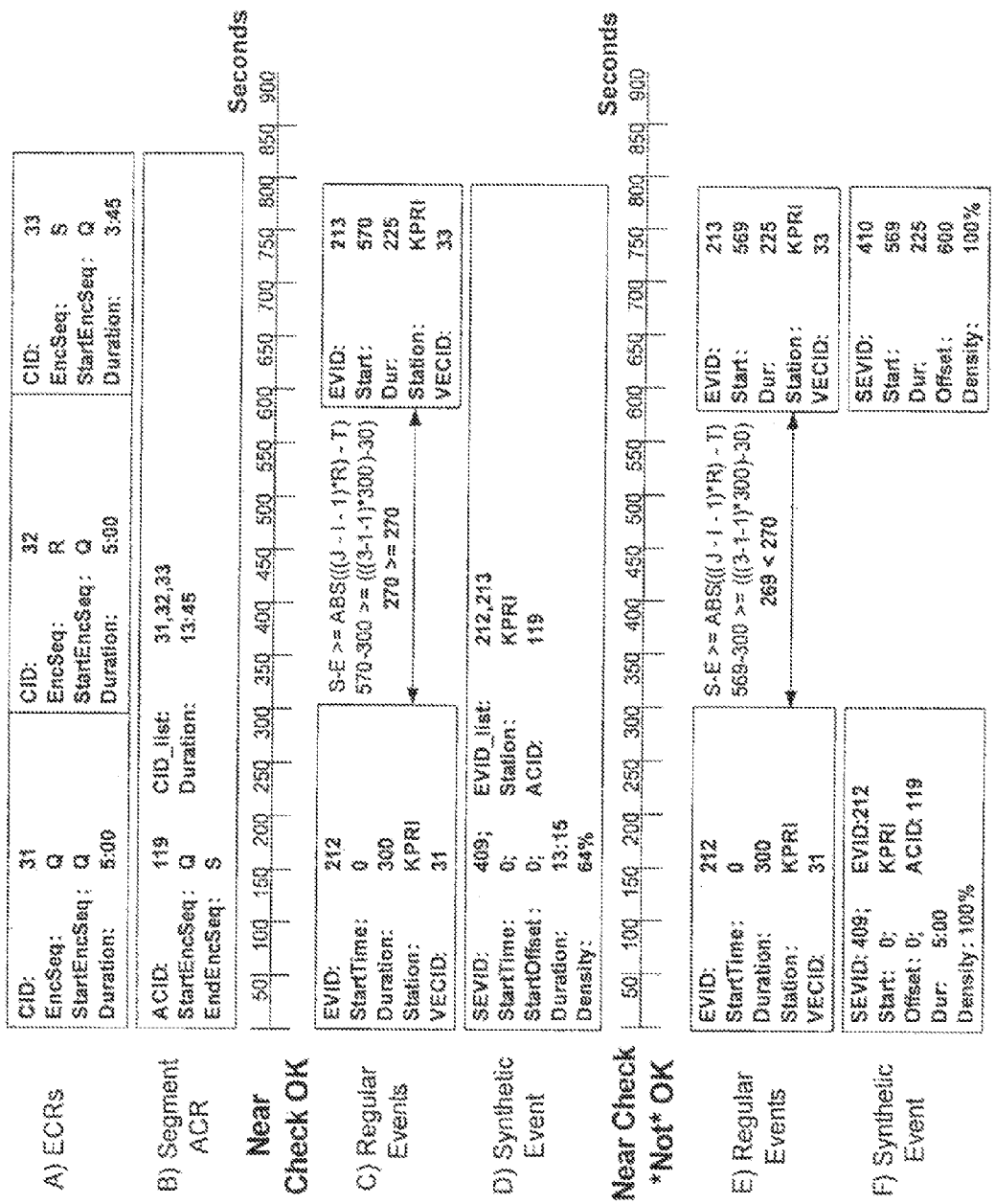
FIG. 16 illustrates synthetic program aggregation in accordance with an example embodiment of the present invention.

FIG. 16 illustrates a similar evaluation where the lower range becomes pertinent (this is known as the "near check"). Section (A) and (B) are identical to their counterparts in FIG. 15. In section (C), the regular events are separated by exactly 270 seconds, which is within the lower bound calculated in step 3. As a result, a single synthetic event is generated in accordance with section (D). When, as in section (E), the separation of regular events is smaller than the lower bound calculated in accordance with step 3, two separate synthetic events are generate and reported, as illustrated in section (F).

Synthetic Program Event Truncation:

A truncated synthetic event is one that has a shorter duration than its corresponding segment ACR. In the normal course of synthetic event generation, the AEC computes the duration and the start time offset of the program segment synthetic event, where the duration is reported as the sum of the durations of constituent ECRs. However, when the duration of regular events are shorter than the ECR length by at least the time accuracy tolerance for programs (e.g. 30 seconds), the synthetic event is reported with a truncated duration. FIG. 17 illustrates synthetic event truncation. Sections (A) and (B) show the ECRs and Segment ACR of the broadcast content. In section (C), all events other than the last event have durations that match the corresponding ECRs. Since this difference is 50 seconds (which is larger than the example program time accuracy tolerance or 30 seconds), the synthetic event of section (D) is reported with a truncated duration of 17:55.

The type of truncation illustrated by sections (C) and (D) is referred to a "simple truncation." In most truncations, as the one shown in section (D), the start time offset is typically reported as 0. One exception occurs when the first regular event is shorter than the corresponding ECR duration by at least the time accuracy tolerance for programs (e.g., 30 seconds). In such cases, the start time offset is increased to reflect the difference between the duration of the regular event and the corresponding ECR duration. This is illustrated by sections (E) and (F), where the first regular event of section (E) is not only shorter than its corresponding ECR duration by 50 seconds, but it also reported as having a start time of 50 seconds. In this case, the synthetic event of section (F) is reported with a truncated duration of 17:55, and an offset starting point of 50 seconds.

Figure 18:
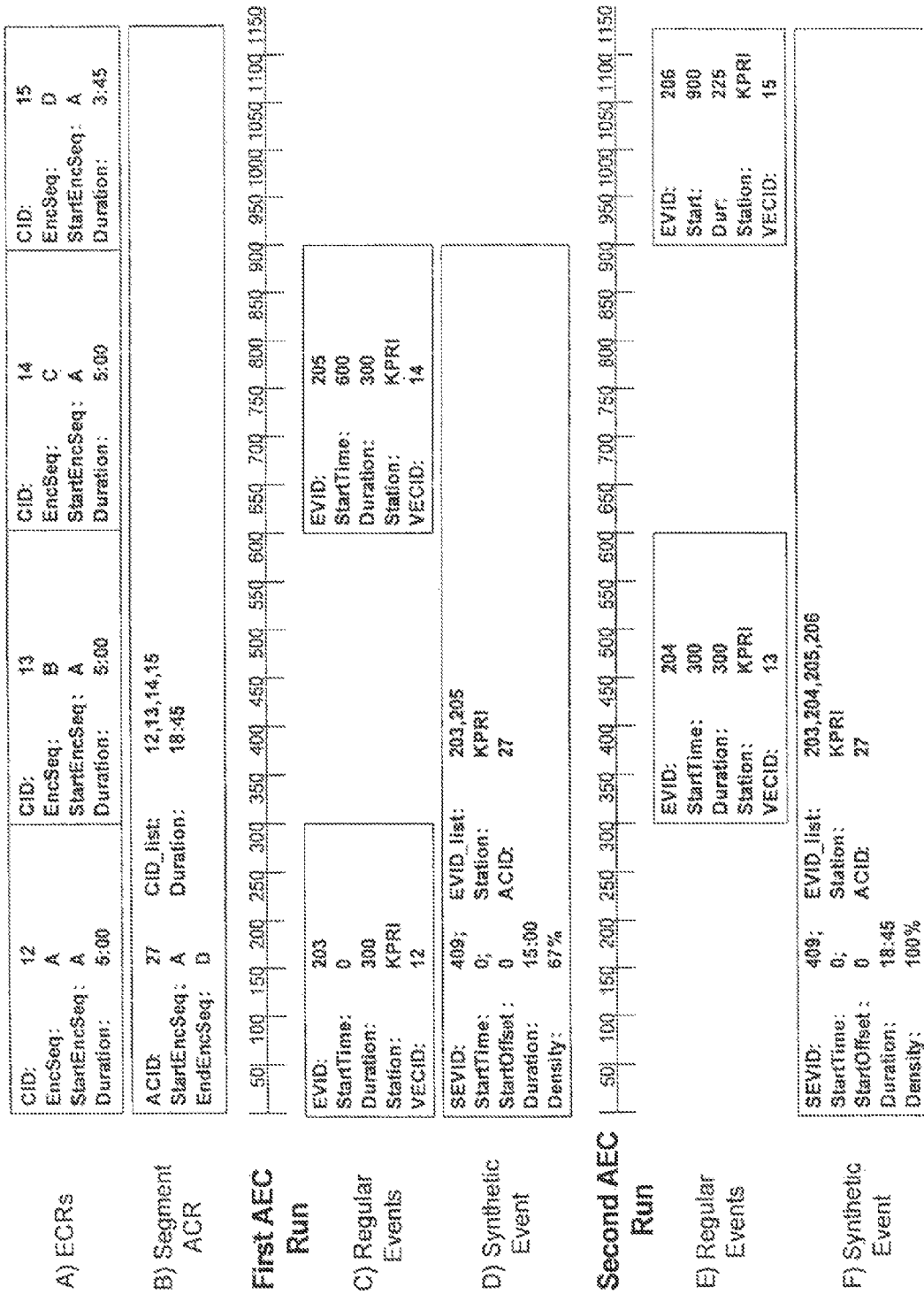
FIG. 18 illustrates synthetic program event completion in accordance with an example embodiment of the present invention.

Synthetic Program Event Completion:

Late arrivals are those detections that arrive at the AEC after a pertinent event has already been created. The AEC is designed to handle these arrivals in a fashion that prevents the reporting of duplicate events to customers. Late arrivals can occur due to outages on links from EARs or for arrivals that span an AEC execution run. The AEC reprocesses events that may be affected by late arrivals. As part of this reprocessing step, it may also determine that it needs to report new events, or discard the arrivals. In the same way that the AEC may reconsider all events that may have relevant arrivals in its input transaction pool, it must reconsider synthetic events when new regular events are created. This is illustrated in FIG. 18. Sections (A) and (B) represent the customary ECRs and Segment ACR of the broadcast content. Sections (C) and (D) illustrate the generation of a first synthetic event after the generation of two regular events with EVID values of 203 and 205, respectively. The duration and density of this synthetic event, reported as 15 minutes and 67%, respectively, reflect the presence of gaps that are due to missing events. But once the late-arriving events of section (E) are received pursuant to the second AEC run, a new synthetic event with full duration of 18:45 and density of 100% is generated and reported as shown in section (F).

Hybrid Watermarking and Fingerprinting

Fingerprinting refers to the extraction of certain host signal characteristics that can be subsequently used to uniquely identify that signal. Generation of fingerprints often involves breaking the content into smaller segments and generating a unique fingerprint for each segment. This way a series of fingerprints may be used to identify successive segments of a content. As opposed to watermarking that requires the insertion of a foreign signal into the host content, fingerprinting provides a non-interfering identification scheme that may be preferred for two reasons. First, it eliminates any possibility of content degradation due to the insertion of an additional signal, and second, it can identify 'legacy' content that has been already distributed without watermarks. On the other hand, fingerprinting techniques are often plagued by having a larger false positive rate, and requiring sophisticated and computationally expensive searching and sorting capabilities. In addition, fingerprints are not capable of carrying a payload, which limits their usefulness in certain applications.

Figure 19:
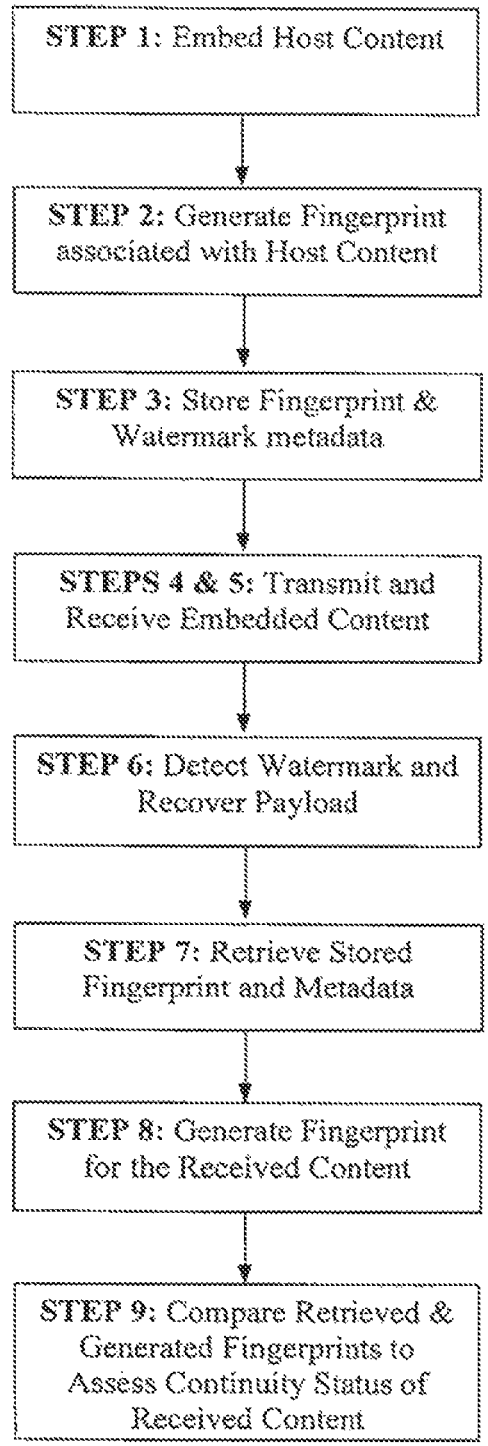
FIG. 19 is a flow chart describing continuity assessment using a hybrid watermarking-fingerprinting approach in accordance with an example embodiment of the present invention.

Some of the above limitations may be overcome by combining fingerprinting and watermarking techniques for identification of a host content. One such technique is disclosed in the commonly owned, co-pending U.S. patent application Ser. No. 10/600,081. A hybrid watermarking-fingerprinting approach may also facilitate continuity assessment of a host signal that contains embedded watermarks. An example procedure is illustrated in the flowchart of FIG. 19, and may involve:

Step 1: Embedding the host content with appropriate watermarks that contain a Content Identification (CID) field. The CID may, for example, be a 50-bit serial number that uniquely identifies that content.

Step 2: Generating a fingerprint in accordance with an appropriate algorithm.

Step 3: Storing the fingerprint and watermark metadata information in such a way that stored information can be easily retrieved by specifying the appropriate CID. This can be done, for example, by using the CID as an index to a database. The stored meta-data may comprise additional information that may assist in proper identification, assessment and management of the content. An example of associated metadata information is discussed above in connection with broadcast monitoring (e.g., in FIGS. 11-18). Other types of metadata may include measures of embedding success in the original content (e.g., a 'detectability metric' as disclosed in the commonly owned, co-pending U.S. patent application Ser. No. 10/681,953), embedding stego key parameters such as precise embedding locations, embedding strengths and the like, embedder identification information, usage and licensing policies associated with the content including date of expiration and/or usage of the content, and the like.

Step 4: Storing, broadcasting, or otherwise disseminating the embedded content.

Step 5: Receiving the content after transmission through a variety of possible channels, where the original signal may have undergone various intentional or unintentional signal processing steps and/or channel distortions.

Step 6: Performing watermark detection to identify the CID payloads of the watermark.

Step 7: Retrieving stored fingerprint and other metadata information from the database in accordance with the recovered CID in step 6.

Step 8: Generating the fingerprint for the received signal.

Step 9: Comparing the calculated fingerprint to the retrieved fingerprint, on a segment-by-segment basis to assess continuity of the received signal.

One of the advantages of the above hybrid approach is that it eliminates the need for a sophisticated and expensive fingerprint database search algorithm while maintaining low false positive rates associated with the embedded watermarks.

Internet Monitoring and Filtering

As the Internet is fast becoming one of the more dominant channels for transmission and dissemination of multimedia content, it is becoming increasingly important to provide tools for identifying, monitoring, and managing Internet Content (the term "Internet Content" refers to any signal that is capable of being transmitted and received over the Internet, and, for example, it may comprise audio, video, still images, text, or other forms of signals). To this end, broadcast monitoring techniques may be adapted to provide such services for Internet content. A detailed description of such techniques may be found in commonly owned co-pending U.S. patent application Ser. Nos. 10/681,953 and 11/501,668. Such techniques may incorporate continuity assessment methods of the preceding section to identify and characterize the gaps, insertions or segment re-orderings that may exist in an Internet content. In addition to monitoring applications, content management systems may also trigger certain reactions upon the recovery of embedded watermarks. Some of these reactions, as disclosed in the commonly owned, co-pending U.S. patent application Ser. No. 11/410,961, comprise blocking the playback/recording of the content, displaying a warning notice, muting or blanking of the content, and the like (for the purposes of this section, these reactions will be collectively referred to as 'Internet Filtering').

In order to provide effective and flexible methods for effecting Internet Filtering, the content management system must be able to recognize and react to the presence and type of embedded watermarks. These reactions may differ depending on the extent, type, quality, density, separation, expiration date, and other attributes and characteristics associated with the embedded watermarks. For example, there may be a zero-tolerance policy regarding Internet dissemination of a theatrical movie that is captured by a camcorder. In this case, the detection of a single watermark with a Theatrical-type payload may result in complete stoppage of playback or recording. On the other hand, there may be legitimate fair use cases of a copyrighted content that should result in no Internet Filtering. For example, a content owner may have expressly permitted free use of his content as long as the usage does not exceed a certain length, or only if it occurs after a certain date, etc. In other cases, it may make sense to allow a grace period for free usage of content, evaluated based on density, separation or the order of detected watermarks (e.g., in birthday party scenarios). In yet, another example, an attacker may have intentionally tried to manipulate the content, by cutting, inserting and re-ordering various segments in order to circumvent any restrictive reactions. In all such cases, the disclosed continuity assessment techniques may be employed for implementing a 'smart' Internet filter that operates in accordance with the detected watermarks, the associated metrics (such as quality, extent, density, separation, etc.), and the proper enforcement policy as set forth by the content owner, by the rule of law, or by common sense.

Figure 20:
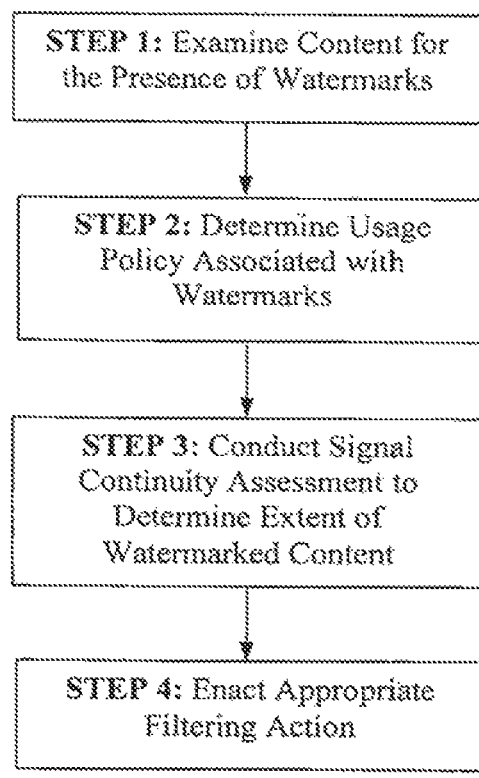
FIG. 20 is a flow chart describing continuity assessment using a hybrid watermarking-fingerprinting approach in accordance with an example embodiment of the present invention.

To further illustrate this concept, assume, for example, that per a content owner's usage terms, license-free usage of his content is allowed for segments not exceeding 2% of the total content. In order to enable this type of content assessment capability, the content may be embedded with watermarks that carry, as their payload, a unique content identifier (CID), a counter of appropriate size, and the duration of the total content (e.g., 24 minutes). A smart filter that is configured to evaluate an incoming multimedia content for the above license-free usage terms may use the example procedure shown in the flowchart of FIG. 20, including:

Step 1: Examining the content for the presence of watermarks;

Step 2: Determining the usage policy associated with the detected watermarks. This, for example, may be done by extracting the CID portion of watermark payload and retrieving the associated usage policy. Note that some usage policies may be readily ascertained just from the detection of watermark type (e.g., detection of a Theatrical-type watermark may result in immediate filtering). In other cases, the usage terms may be locally available to the smart filter (e.g., as part of filter configuration parameters). In yet other cases, the usage policy may be retrieved from a connected database of information.

Step 3: Conducting signal continuity assessment to determine whether or not the extent of watermarked content conforms to the terms of the usage policy. This can be done using any one of a myriad of signal continuity assessment techniques described in the preceding sections, complemented by packet prediction and gap aggregation. These techniques provide a reliable estimate of the extent of a copyrighted signal. Dividing this estimate by the total length of the copyrighted content (which, in this example, is part of the watermark payload) produces the percentage of content usage that can be compared against the 2% limit specified by the usage policy.

Step 4: Enacting the appropriate filtering action if the terms of usage license are not met. Similar to the determination of usage terms, the particular filtering actions may be ascertained from the type of embedded watermarks, or from a local or remote storage repository. Examples of such actions include complete stoppage of playback, displaying a warning notice, or re-directing the user to a different Internet location.

Other Applications

The preceding signal continuity assessment techniques may be applied to a great variety of applications. Some of these applications have been described in various levels of details throughout the present application, and others will be apparent to those skilled in the art in view of the present application. In general, signal continuity assessment can be used to detect the presence of signal modifications, as well as detecting the presence and extent of watermarked (and perhaps copy-righted) segments within a broader content. These segments may comprise separate portions of the content, or may occur as fully or partially overlapping segments. For example, such overlapping segments may be produced when the originally embedded signal components are later combined to produce a new content signal (this process is sometimes referred to as producing a 'mash-up'). Since the robust watermarks of the present invention, as disclosed in the commonly owned co-pending U.S. patent application Ser. Nos. 11/116,137, 11/410,961, and 11/115,990, can still be uniquely identified after such signal combinations (i.e., they are robust to over-writing attacks), the constituent watermarked segments, which may overlap in time, frequency, space or other domains, can be uniquely identified and analyzed in accordance with any one of the preceding signal continuity assessment techniques. The following example list provides a non-exhaustive list of applications in which signal continuity assessment techniques may be applied:

Integrity verification: A content comprising audio, video, image, text or other information (or any combination thereof) is examined to determine if it has undergone any modifications. A typical usage scenario involves authentication of documents presented at a court of law. Objective is to identify the presence of such an attack or prove the content integrity, e.g. the absence of any discontinuity.

Proof of performance in broadcast content: Advertisers pay for their commercials to be broadcast in entirety. Any omission, cut or other damage of the commercials can be a basis to require a refund or a rebroadcast.

Royalty tracking for production music: Production music is incorporated in newly created audio or audiovisual content in a complex process that involves a substantial tailoring of the original sound track. Royalty payment depends on how much of original music actually is used in the new content. By extension, the same tracking concept applies to other multi-media formats such as video scenes, animation libraries, and the like.

Spurious capture: This application has been described throughout the specification as the 'Birthday Party' scenario. In the process of making a home video and/or audio recording, documentary program, live broadcast, and the like, portions of a copyrighted content is intermittently captured by the recording device. The objective is to discriminate such intermittently captured content from an intentional piracy attempt. Since a pirated content is likely to comprise long durations of uninterrupted copyrighted content, it can be characterized as having relatively few discontinuities with short durations while an intermittent capture scenario is likely to involve more frequent and longer interruptions. One factor in making such determination may be the aggregate extent of detected watermarked content in comparison to the extent of original watermarked content (e.g., the duration of original programming may be carried as part of watermark payload).

Fair use classification: Some copyrighted content may be copied and used for the purpose of critique, parody, creation of a substantially new work, etc., without an author's permission. The distinction between fair use and plagiarism (or piracy) is complex and nuanced, and may not be resolved without subjective evaluation. But by applying the preceding signal continuity techniques it may be possible to provide one or more metrics to characterize the 'continuity' status of copyrighted segments. These can be subsequently used to classify the content into different categories such as clear cases of fair use, unauthorized use, and the in-between cases that require further subjective evaluation. This application is particularly pertinent to Internet services, where prompt filtering of clear piracy attempts may be desirable. Factors in effecting such classifications may include the length and density of discontinuities, and the proportion of original copyrighted content that is present in the content under investigation.

Electronic citation: In this application, the detection of watermarked segments may automatically invoke a citation response, which, for example, reports information such as identity, extent, continuity status, and copyright status of the watermarked segments. This is analogous to citing references at the end of a book chapter or magazine article. The citation capability may be implemented with or without connectivity to an external source of additional information. For example, the watermark payload may simply carry a 'copyright' flag, which may be used in conjunction with signal continuity techniques to provide precise locations of copyrighted material within a broader content. Additionally, or alternatively, the watermark may carry the content title, a unique content identifier, or as much information that can be practically carried in the payload, to provide a more detailed citation. If outside connectivity is available, additional databases of information can be consulted to provide even more features, such as owner's contact information, licensing authorizations, other works of the content owner, citations to similar content, and the like. By using the automatic citation capability, original owners may be identified and acknowledged (which may or may not result in financial benefits to the owner). This capability is expected to be useful in 'content sampling' and 'mash-up' applications where a multiplicity of different music or video segments are combined to form a new content.

Audience measurement: Audience measurement devices that are equipped with continuity detection apparatus may determine whether or not the consumer has viewed the entire advertisement or program. The extent of continuous viewing may be used to provide better metrics for television or radio ratings. In addition, in audience interactive applications, the content owner may provide incentives, such as electronic coupons, in accordance with the extent of continuous viewing of the broadcast programs.

Note that while the various embodiments of the present invention have been described under different headings, the categorization of topics is merely done to facilitate the presentation of the present invention. Therefore, it is entirely possible for a disclosed technique to be categorized under two or more headings. For example, while the watermark packet bit scrambling has been presented as a type of Watermark channel code modification, it would also qualify as a type of "stego-key recognition" since the scrambling sequences are part of the embedding and/or extraction stego keys.

It should now be appreciated that the present invention provides advantageous methods, apparatus, and systems for signal continuity assessment using embedded watermarks.

Although the invention has been described in connection with various illustrated embodiments, numerous modifications and adaptations may be made thereto without departing from the spirit and scope of the invention as set forth in the claims.

Figure 21:
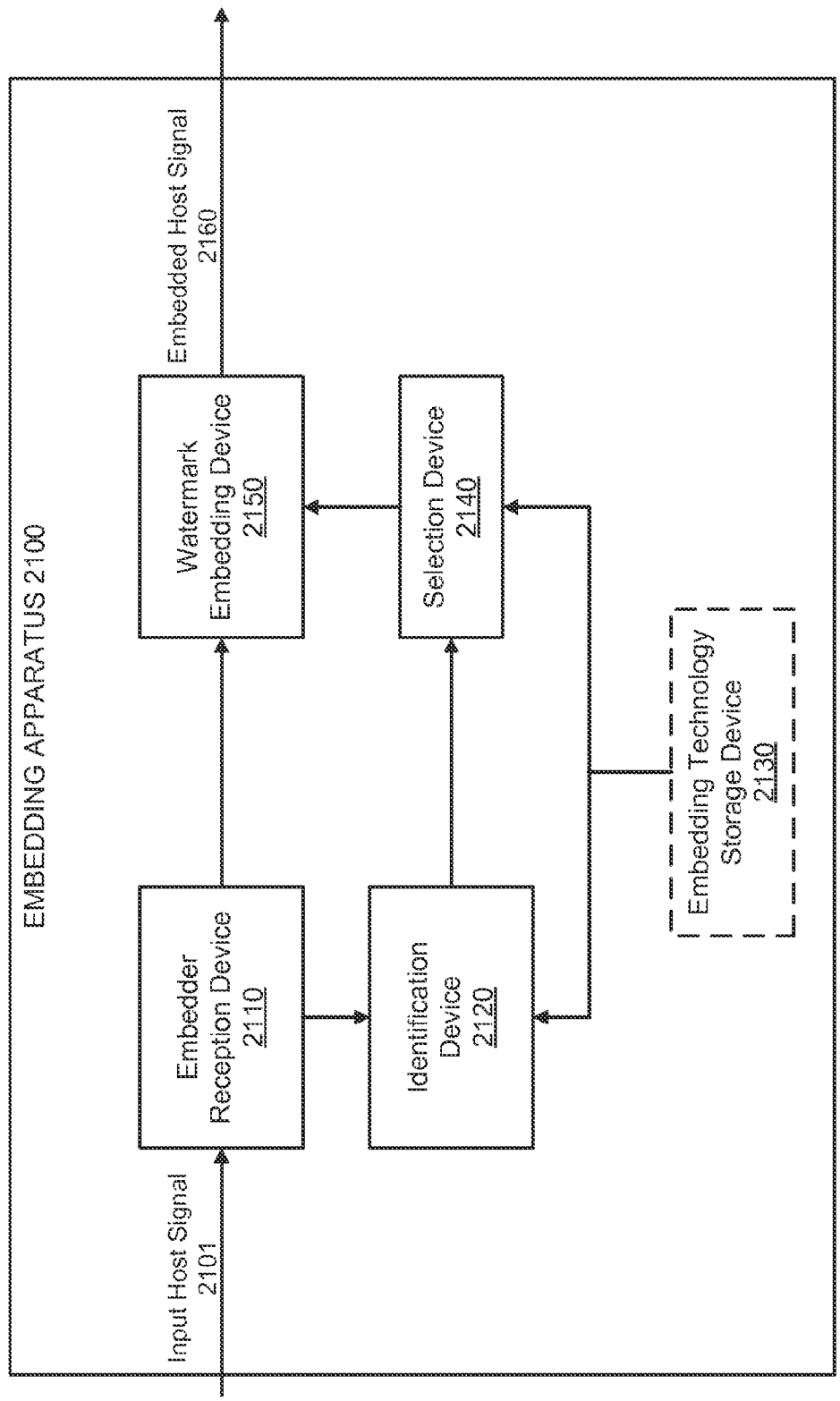
FIG. 21 is a block diagram showing an example embodiment of an Embedding Apparatus in accordance with the present invention.

FIG. 21 shows a block diagram of an Embedding Apparatus 2100 in accordance with an exemplary embodiment of the present invention. The incoming host signal 2101 containing the digital host content is received by a receiver or other device incorporating a receiver (e.g., Embedder Reception Device 2110 of the Embedding Apparatus 2100). As the input host content signal 2101 may be in a variety of formats and may comprise several audio, video, multimedia, or data signals, it is necessary for the Embedder Reception Device 2110 to appropriately condition the incoming host signal 2101 into the proper form that is recognizable by other components of the embedding apparatus 2100. This conditioning may comprise signal processing steps, such as, for example, demodulation, decompression, de-interleaving, decryption, descrambling, resampling, A/D conversion, re-formatting, filtering, or the like. It is also understood that some of the required signal conditioning steps may be carried out in other sections of the embedding apparatus such as the Watermark Embedding Device 2150. The conditioned (or partially conditioned) signal is then processed by the Identification Device 2120 in order to identify multiple embedding opportunities or locations within the host signal. All possible embedding opportunities may be identified. Alternatively, the identification of the embedding opportunities may be performed in accordance with all or some of the embedding technologies that may be used for embedding watermarks. A Selection Device 2130 then selects a subset of the identified embedding opportunities.

An optional Embedding Technology Storage Device 2140 may be provided in order to store available embedding technologies. The Storage Device 2140 may be regularly upgraded to contain up-to-date versions of the embedding technology parameters, algorithms or settings. It should be understood that the presence of a separate storage device may not be necessary, as other components of the embedding apparatus such as the Selection Device 2140 or the Watermark Embedding Device 2150 may contain the appropriate information related to the available embedding technologies and/or contain upgradeable memory modules that can be utilized for this purpose. The Selection Device 2140 may also select one or more watermark embedding technologies from the Storage Device 2130 (or other storage location). Once the appropriate embedding opportunities and the one or more watermark embedding technologies have been selected, the Watermark Embedding Device 2150 embeds the watermarks in accordance with the selected watermark embedding technologies at the locations corresponding to the selected subset of embedding opportunities in the host content to produce an embedded host signal 2160. The embedded host signal 2160 may then be further processed, stored or transmitted.

It should be understood that the Embedding Apparatus 2100, as shown in FIG. 21, may comprise a variety of digital, analog, optical or acoustical components. For example, the Embedding Apparatus may be implemented using a digital signal processing (DSP) unit, FPGA and ASIC devices, or may be implemented in a computer or hand-held device. It should also be understood that while the Embedding Apparatus 2100 of FIG. 21 may be implemented as a single embedding unit, it is also possible to break-up its constituent components to form a distributed embedding device. For example, it is entirely possible to place the Watermark Embedding Device 2150 at one physical location while the remainder of the embedding apparatus is placed at another physical location or multiple physical locations. The distribution of the embedding components may be done in accordance with the computational requirements of each component and the availability of computational resources at each location. The various components of such distributed apparatus may be interconnected using a variety of connectivity means, such as, for example, the Internet, dedicated phone lines, various wired or wireless computer networks, or even physical media such as portable storage devices.

One important factor in designing a watermarking system is the computational complexity of watermark extractors. This requirement can be stated as maximum Millions of Instructions Per Second (MIPS) value, maximum gate count, maximum ROM and RAM size, etc. In principle, the watermark extractor cost should be a small fraction of the cost of the device, or its processing load should amount to a small fraction of the processing load of the host software module.

Figure 22:
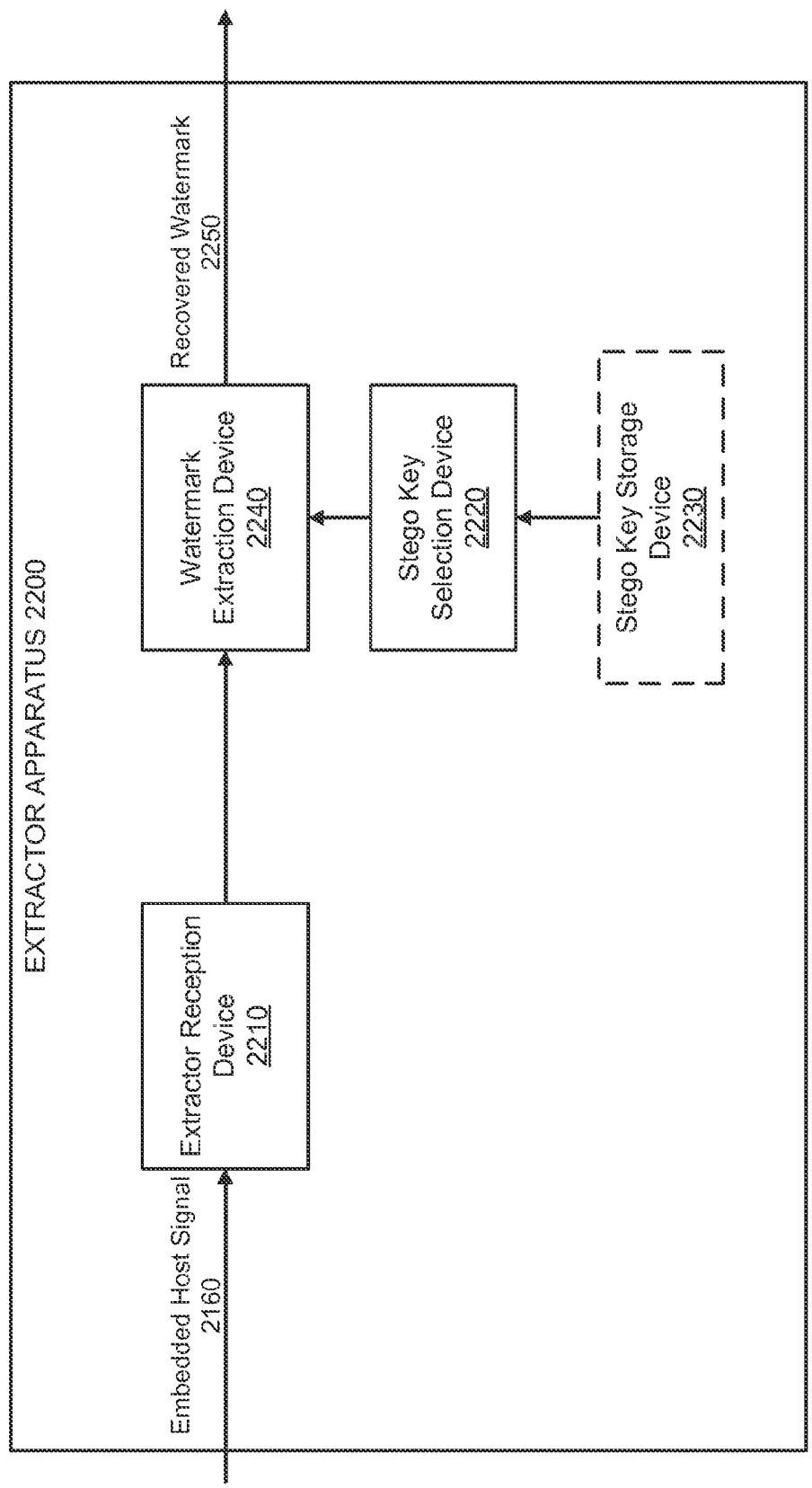
FIG. 22 is a block diagram showing an example embodiment of an Extractor Apparatus in accordance with the present invention.

FIG. 22 shows a block diagram of an Extractor Apparatus 2200 in accordance with an exemplary embodiment of the present invention. The Extractor Apparatus 2200 may be implemented using the same or similar technology as the Embedding Apparatus 2100 discussed above. Further, like the Embedding Apparatus 2100, the Extractor Apparatus 2200 may be implemented as either a single unit or as a distributed device consisting of several discrete components at the same or different physical locations. The incoming embedded host signal 2160 (e.g., produced by the Embedding Apparatus 2100 of FIG. 21) is received at a receiver or other device incorporating a receiver (e.g., Extractor Reception Device 2210 in the Extractor Apparatus 2200). Similar to the conditioning operations discussed in relation to the Embedder Reception Device 2110 of FIG. 21, the Extractor Reception Device 2210 may appropriately condition the incoming embedded host signal 2160. A Stego Key Selection Device 2220 then selects at least one stego key from a collection of stego keys that are stored in Stego Key Storage Device 2230. The selected stego keys are subsequently used by the Watermark Extraction Device 2240 to recover the embedded watermarks from the embedded host signal 2160 to provide the recovered watermarks 2250.

The Stego Key Selection Device 2220 may select the at least one stego key to produce at least one of optimum robustness, security, and computational efficiency for the extraction of watermarks embedded in the host content. Further, the Stego Key Selection Device 2220 may select the at least one stego key to produce a desired tradeoff between levels of robustness, security, and computational efficiency for the extraction of watermarks embedded in the host content.

The selecting of the one or more stego keys by the Selection Device 2220 may be adapted in accordance with a desired false positive detection rate. The selecting of the one or more stego keys may be adapted to produce a desired probability of successful extractions. Further, the selecting of the one or more stego keys may be adapted to produce a desired computational complexity for the extraction of the watermarks. Additionally, the selecting of the one or more stego keys may be adapted to anticipate transformations of the host content. Such transformations of the host content may modify watermark characteristics of the embedded watermarks. For example, the transformations may alter the appearance of at least one watermark that is embedded with a first embedding stego key such that the at least one embedded watermark appears to have been embedded with a second embedding stego key.

These keys can be assigned at random to the corresponding extraction devices, but also can be assigned in view of extraction device properties. For example, if the extractor resides in a camcorder that may be used for theater piracy, the extractor key set doesn't need to include transform keys obtained through speed up or slow down of the content. Similarly, if the extractor resides in a software module that has an expiration date, upon which new software must be downloaded, then it would be advantageous to make phased distribution of extractor keys similar to that proposed for embedders.

It should also be appreciated that the Embedding Apparatus 2100 described in connection with FIG. 21 may be used in connection with the Extractor Apparatus 2200 described in connection with FIG. 22 to form a system for embedding and extracting digital watermarks.

In one embodiment, the Watermark Extraction Device 2210 (or a separate processor associated therewith (not shown)) may assess the validity of the extracted watermarks by multiplying each discrete symbol value by the likelihood measure corresponding to the symbol value to produce weighted watermark symbols. The weighted watermark symbols may be arranged in a pre-defined order to form a weighted watermark packet. The number of errors in the weighted watermark packet may be compared to a pre-determined reference value in order to assess the validity of the watermark.

Although the invention has been described in the context of various preferred embodiments, it should be appreciated that many different adaptations of the present invention may be made without departing from the scope of the invention. For example, the techniques describes in the present invention may be readily adapted to analog, digital, optical or acoustical domains. This includes, but not limited to, the utilization of optical and acoustical techniques for manipulating the signals of present invention. Additionally, the "signals" described in the context of present invention refer to any entity that can be manipulated to effect the various embodiments of the present invention, ranging from electrical, electromagnetic or acoustic signals to the signals produced by mechanical shaping of a surface. Furthermore, the signals of the present invention may be transmitted, displayed or broadcast or may be stored on a storage medium, such as an optical or magnetic disk, an electronic medium, a magnetic tape, an optical tape or a film.

What is claimed is:

1. A method for improving detection of a change in arrangement of sections of a content, comprising:
   detecting a first watermark message from a first location of multimedia content, the first detected watermark message being a strong watermark message with an associated first false positive detection probability value that is below a first predetermined threshold;
   determining a presence of at least a portion of a second watermark message from a second location of the multimedia content, including:
      based on watermark symbol values of the detected strong watermark message, constructing a template of watermark symbol values,
      extracting watermark symbols from the second location of the multimedia content to form at least a portion of a candidate watermark message,
      comparing all or part of the constructed watermark template to at least the portion of the candidate watermark message to determine, based on an error threshold value, that at least the portion of the second watermark message is present in the multimedia content, the error threshold value corresponding to a predetermined number of errors that, when detected in the candidate watermark message without using the template of watermark symbol values, corresponds to a second false positive detection probability value that is larger than the first predetermined threshold; and
   detecting a location of a change in arrangement of the sections of the multimedia content based on at least the portion of the second watermark message, wherein the location of the change is detected with improved granularity compared to detection of the location of the change that is solely based on the first watermark message.

2. The method of claim 1, wherein the watermark symbol values of the second watermark message are identical to corresponding symbol values of the first watermark message.

3. The method of claim 1, wherein the watermark symbol values of the second watermark message have a predefined relationship to corresponding symbols of the first watermark message.

4. The method of claim 3, wherein the predefined relationship includes a difference between the watermark symbol values of the first watermark message and corresponding symbols of the second watermark message due to having a first packet number value in the first watermark message that is different from a second packet number value in the second watermark message.

5. The method of claim 4, further comprising:
   detecting the first packet number from the first watermark message and the second packet number from the second watermark message, and
   using the first packet number and the second packet number to determine whether the change in arrangement of sections of the multimedia content includes a cut, an insertion or a reordering of multimedia content segments.

6. The method of claim 1, wherein the comparing includes comparing a fraction of the constructed watermark template to the candidate watermark message to establish the presence of a fraction of the second watermark message that identifies a boundary of the location of the change in arrangement of the sections of the multimedia content with an improved granularity.

7. The method of claim 1, wherein the comparing includes comparing the entire constructed watermark template to the candidate watermark message to establish the presence of the full second watermark message.

8. A computer program product embodiment on one or more non-transitory computer readable media, comprising:
   program code for detecting a first watermark message from a first location of a multimedia content, the first detected watermark message being a strong watermark message with an associated first false positive detection probability value that is below a first predetermined threshold;
program code for determining a presence of at least a portion of a second watermark message from a second location of the multimedia content, including:
based on watermark symbol values of the detected strong watermark message, constructing a template of watermark symbol values,
extracting watermark symbols from the second location of the multimedia content to form at least a portion of a candidate watermark message,
comparing all or part of the constructed watermark template to at least the portion of the candidate watermark message to determine, based on an error threshold value, that at least the portion of the second watermark message is present in the multimedia content, the error threshold value corresponding to a predetermined number of errors that, when detected in the candidate watermark message without using the template of watermark symbol values, corresponds to a second false positive detection probability value that is above the first predetermined threshold; and
program code for detecting a location of a change in arrangement of the sections of the multimedia content based on at least the portion of the second watermark message, wherein the location of the change is detected with improved granularity compared to detection of the location of the change that is solely based on the first watermark message.

9. The computer program product of claim 8, wherein the watermark symbol values of the second watermark message are identical to corresponding symbol values of the first watermark message.

10. The computer program product of claim 8, wherein the watermark symbol values of the second watermark message have a predefined relationship to corresponding symbols of the first watermark message.

11. The computer program product of claim 10, wherein the predefined relationship includes a difference between the watermark symbol values of the first watermark message and corresponding symbols of the second watermark message due to having a first packet number value in the first watermark message that is different from a second packet number value in the second watermark message.

12. The computer program product of claim 11, further comprising:
program code for detecting the first packet number from the first watermark message and the second packet number from the second watermark message, and
program code for using the first packet number and the second packet number to determine whether the change in arrangement of sections of the multimedia content includes a cut, an insertion or a reordering of multimedia content segments.

13. The computer program product of claim 8, wherein the comparing includes comparing a fraction of the constructed watermark template to the candidate watermark message to establish the presence of a fraction of the second watermark message that identifies a boundary of the location of the change in arrangement of the sections of the multimedia content with an improved granularity.

14. The computer program product of claim 8, wherein the comparing includes comparing the entire constructed watermark template to the candidate watermark message to establish the presence of the full second watermark message.

15. A device, comprising:
a processor; and
a memory including processor executable code, the processor executable code, when executed by the processor, causes the processor to:
detect a first watermark message from a first location of a multimedia content, the first detected watermark message being a strong watermark message with an associated first false positive detection probability value that is below a first predetermined threshold;
determine a presence of at least a portion of a second watermark message from a second location of the multimedia content, including:
based on watermark symbol values of the detected strong watermark message, construct a template of watermark symbol values,
extract watermark symbols from the second location of the multimedia content to form at least a portion of a candidate watermark message,
compare all or part of the constructed watermark template to at least the portion of the candidate watermark message to determine, based on an error threshold value, that at least the portion of the second watermark message is present in the multimedia content, the error threshold value corresponding to a predetermined number of errors that, when detected in the candidate watermark message without using the template of watermark symbol values, corresponds to a second false positive detection probability value that is above the first predetermined threshold; and
detect a location of a change in arrangement of the sections of the multimedia content based on at least the portion of the second watermark message, wherein the location of the change is detected with improved granularity compared to detection of the location of the change that is solely based on the first watermark message.

16. The device of claim 15, wherein the watermark symbol values of the second watermark message are identical to corresponding symbol values of the first watermark message.

17. The device of claim 15, wherein the watermark symbol values of the second watermark message have a predefined relationship to corresponding symbols of the first watermark message.

18. The device of claim 17, wherein the predefined relationship includes a difference between the watermark symbol values of the first watermark message and corresponding symbols of the second watermark message due to having a first packet number value in the first watermark message that is different from a second packet number value in the second watermark message.

19. The device of claim 18, wherein the processor executable code, when executed by the processor, causes the processor to:
detect the first packet number from the first watermark message and the second packet number from the second watermark message, and
use the first packet number and the second packet number to determine whether the change in arrangement of sections of the multimedia content includes a cut, an insertion or a reordering of multimedia content segments.

20. The device of claim 15, wherein the processor executable code, when executed by the processor, causes the processor to compare a fraction of the constructed watermark template to the candidate watermark message to establish the presence of a fraction of the second watermark message that identifies a boundary of the location of the change in arrangement of the sections of the multimedia content with an improved granularity.

21. The device of claim 15, wherein the processor executable code, when executed by the processor, causes the processor to compare the entire constructed watermark template to the candidate watermark message to establish the presence of the full second watermark message.

* * * * *